US009168787B2

(12) United States Patent
Oyama

(10) Patent No.: US 9,168,787 B2
(45) Date of Patent: Oct. 27, 2015

(54) STEEL CORD FOR REINFORCING RUBBER ARTICLE, AND PNEUMATIC TIRE USING SAME

(75) Inventor: Yuji Oyama, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 99 days.

(21) Appl. No.: 13/991,201

(22) PCT Filed: Dec. 14, 2011

(86) PCT No.: PCT/JP2011/078925
§ 371 (c)(1),
(2), (4) Date: Jun. 3, 2013

(87) PCT Pub. No.: WO2012/081624
PCT Pub. Date: Jun. 21, 2012

(65) Prior Publication Data
US 2013/0248074 A1    Sep. 26, 2013

(30) Foreign Application Priority Data

| Dec. 16, 2010 | (JP) | 2010-280551 |
| Jan. 18, 2011 | (JP) | 2011-007882 |
| Feb. 17, 2011 | (JP) | 2011-031868 |
| Feb. 17, 2011 | (JP) | 2011-031869 |
| Feb. 17, 2011 | (JP) | 2011-031870 |

(51) Int. Cl.
*B60C 9/18* (2006.01)
*D07B 1/10* (2006.01)
(Continued)

(52) U.S. Cl.
CPC .............. *B60C 9/0007* (2013.04); *D07B 1/005* (2013.01); *D07B 1/062* (2013.01); *B60C 9/2006* (2013.04);
(Continued)

(58) Field of Classification Search
CPC .................................... B60C 9/18; D07B 1/10
See application file for complete search history.

(56) References Cited

U.S. PATENT DOCUMENTS 5,024,261 A * 6/1991 Igarashi et al. ............... 152/527
5,226,987 A * 7/1993 Matsumoto et al. ....... 152/209.5
(Continued)

FOREIGN PATENT DOCUMENTS

| CN | 101272922 A | 9/2008 |
| JP | 3-200403 | * 9/1991 |

(Continued)

OTHER PUBLICATIONS

Translation of JP 2007-63724, 2007.*
(Continued)

*Primary Examiner* — Justin Fischer
(74) *Attorney, Agent, or Firm* — Sughrue Mion, PLLC

(57) ABSTRACT

Provided is a steel cord for reinforcing rubber articles which has both rubber penetration and productivity and which allows to reduce the weight of a tire without compromising the strength of the tire when applied to a tire, and a pneumatic tire using the same.

The steel cord for reinforcing rubber articles of the present invention is a steel cord for reinforcing rubber articles comprising a core formed by arranging two core filaments in parallel without twisting the filaments together, and six sheath filaments twisted around the core. Letting the diameter of the core filament dc (mm), the diameter of the sheath filament ds (mm) and sheath filament twist pitch p (mm), an average sheath filament interval D represented by the following Formula (I):

$$D = [L - 6ds\{1+(L/p)^2\}^{1/2}]/6 \qquad (I),$$

(where $L=(\pi+2)dc+\pi ds$) is from 25 to 80 μm.

6 Claims, 3 Drawing Sheets

(51) Int. Cl.
  *B60C 9/00* (2006.01)
  *D07B 1/06* (2006.01)
  *D07B 1/00* (2006.01)
  *B60C 9/20* (2006.01)

(52) U.S. Cl.
  CPC . *B60C 2009/0092* (2013.04); *B60C 2009/2077* (2013.04); *B60C 2009/2096* (2013.04); *D07B 2201/206* (2013.01); *D07B 2201/2006* (2013.01); *D07B 2201/2018* (2013.01); *D07B 2201/2025* (2013.01); *D07B 2201/2029* (2013.01); *D07B 2201/2051* (2013.01); *D07B 2401/208* (2013.01); *D07B 2501/2046* (2013.01)

(56) References Cited

U.S. PATENT DOCUMENTS

| | | | | |
|---|---|---|---|---|
| 5,833,771 | A | * | 11/1998 | Arnaud et al. ............ 148/325 |
| 6,182,433 | B1 | | 2/2001 | Tagawa |
| 6,701,989 | B2 | * | 3/2004 | Choi et al. ................ 152/556 |
| 2009/0133795 | A1 | | 5/2009 | Chiashi |
| 2011/0253280 | A1 | | 10/2011 | Matsuo |

FOREIGN PATENT DOCUMENTS

| | | | |
|---|---|---|---|
| JP | 4100702 | A | 4/1992 |
| JP | 5-24413 | * | 2/1993 |
| JP | 6-128883 | A | 5/1994 |
| JP | 9-158066 | A | 6/1997 |
| JP | 9156314 | | 6/1997 |
| JP | 11-81168 | A | 3/1999 |
| JP | 2000-008281 | A | 1/2000 |
| JP | 2005-120491 | A | 5/2005 |
| JP | 2007-63724 | * | 3/2007 |
| JP | 2007-63724 | A | 3/2007 |
| JP | 2007-090937 | A | 4/2007 |
| JP | 2007-537364 | A | 12/2007 |
| JP | 2010-173362 | A | 8/2010 |
| WO | 2008126643 | A1 | 10/2008 |
| WO | 2010/073641 | A1 | 7/2010 |
| WO | WO 2010/073641 | * | 7/2010 |

OTHER PUBLICATIONS

International Search Report for PCT/JP2011/078925 dated Feb. 28, 2012.

Communication dated Jun. 26, 2015 from the European Patent Office in counterpart European Application No. 11848911.1.

* cited by examiner

STEEL CORD FOR REINFORCING RUBBER ARTICLE, AND PNEUMATIC TIRE USING SAME

TECHNICAL FIELD

The present invention relates to a steel cord for reinforcing rubber articles (hereinafter, also simply referred to as "steel cord") and a pneumatic tire using the same (hereinafter, also simply referred to as "tire"). More specifically, the present invention relates to a steel cord for reinforcing rubber articles which has both rubber penetration and productivity and which allows to reduce the weight of a tire without compromising the strength of the tire when applied to a tire, and a pneumatic tire using the same. In particular, the present invention relates to a pneumatic tire in which weight reduction is achieved without reducing durability and productivity; a pneumatic tire in which weight reduction is achieved while improving steering stability, durability and productivity; a pneumatic tire which has excellent productivity and in which weight reduction is achieved while improving durability as compared to a conventional tire; and a pneumatic tire which has excellent durability and productivity and in which weight reduction is achieved.

BACKGROUND ART

In recent years, the importance of the environmental performance is increasing, and needs for reducing the weight of rubber articles or tires in which a steel cord is used for a reinforcing member are increasing. In order to reduce the weight of a tire, it is effective to reduce the thickness of a belt. In order to reduce the thickness of the belt, it is effective to make the cross-section of the steel cord into a flat shape, and to make the diameter (minor axis) of the steel cord small.

In general, when a steel cord having a (1×N) structure is made into a flat shape by using a jig such as a pressing roller, an effect of a reinforcing member is reduced since initial elongation occurs when a tensile input is applied to the steel cord. Accordingly, as a cord structure which has a flat shape without compromising the tensile rigidity of the steel cord, for example, structures described in Patent Documents 1 to 4 are proposed. In the steel cord described in Patent Document 1, a technique is proposed in which a 2+6 structure is employed and by providing a space between sheath filaments, rubber penetrates between the filaments. A steel cord described in Patent Document 2 tries to overcome the above-mentioned problems by defining the diameter of a core filament and the diameter of a sheath filament. Further, in the steel cord described in Patent Document 3, a technique is disclosed in which, by defining the diameter of a core filament and the diameter of the sheath filament, rubber penetration to a steel cord is improved. Still further, in Patent Document 4, a technique is disclosed in which, by employing a single-twisted structure or a layer-twisted structure of 6 to 10 steel filaments, rubber penetration is ensured is ensured.

Particularly in a tire for heavy load, there is a trend of large size in the tire, and demands for improving a variety of performances such as steering stability or durability are increasing. In general, as the tire becomes large in size, growth of the diameter of the tire becomes large when the tire is inflated to an inner pressure, which affects significantly on the performance or durability of the tire. For this reason, in a large tire, the growth of the diameter of the tire is inhibited by using a reinforcing layer which is arranged in substantially tire circumferential direction, in other words, in parallel to the tire equatorial line.

As an improvement technology of such a tire for heavy load, it is reported, for example, in Patent Document 5 that by having a predetermined relationship between the minor axis of steel cord bundle and the bundle width thereof and further satisfying a predetermined relationship between the bundle width of the steel cord bundle and the bundle interval, steering stability and durability can be improved while reducing the weight of a tire.

RELATED ART DOCUMENTS

Patent Documents

Patent Document 1: Japanese Unexamined Patent Application Publication No. 9-158066
Patent Document 2: Japanese Unexamined Patent Application Publication No. 2005-120491
Patent Document 3: Japanese Unexamined Patent Application Publication No. 2007-63724
Patent Document 4: Japanese Unexamined Patent Application Publication No. 2007-90937
Patent Document 5: Japanese Unexamined Patent Application Publication No. 2010-173362

SUMMARY OF THE INVENTION

Problems to be Solved by the Invention

However, in Patent Documents 1 to 4, although the rubber penetration, namely, the durability is examined, the productivity of the steel cord is not sufficiently examined. When an excessive space between sheath filaments is generated, the sheath filaments are not dispersed uniformly around a core filament, which has generated a problem of poor productivity. In other words, since tension to each filament tends to become nonuniform when a whole steel cord is bent, part of filament sometimes becomes projected and sprung out. There has also been a problem that the tenacity is reduced since the tension is not uniformly dispersed into filaments when the filament steel cord is pulled. Similarly, in a pneumatic tire described in Patent Document 5, although the tire has excellent steering stability or durability, the productivity of the steel cord is not sufficiently examined.

Since a tire for a light truck is often used under a higher inner pressure and higher load compared to a tire for an automobile, a variety of structures having a belt reinforcing layer composed of a non-metal cord have been proposed. Nowadays, the durability of a belt portion is desired to be further improved.

Further, in particular, a tire for a construction vehicle or a tire for heavy load is desired to have a reduced weight and at the same time an improved cut resistant property for the purpose of prolonging tire life. This is because a tire for a construction vehicle has a problem that, since construction vehicles are obliged to be used on a road surface on which broken rocks are scattered, a cut failure of a belt tends to occur and a tire life is reduced due to either a failure of a tire due directly to the cut or a separation failure induced by corrosion of a steel cord where water is penetrated from the cut.

Accordingly, an object of the present invention is to provide a steel cord for reinforcing rubber articles which has both rubber penetration and productivity and which allows to reduce the weight of a tire without compromising the strength of the tire when applied to a tire, and a pneumatic tire using the same.

Another object of the present invention is to provide a pneumatic tire in which weight reduction is achieved without reducing durability and productivity.

Further, another object of the present invention is to provide a pneumatic tire in which weight reduction is achieved while improving steering stability, durability and productivity.

Still further, another object of the present invention is to provide a pneumatic tire which has excellent productivity and in which weight reduction is achieved while improving durability compared to a conventional tire.

Another object of the present invention is to provide a pneumatic tire which has excellent durability and productivity and in which weight reduction is achieved.

Means for Solving the Problems

In order to resolve the above-mentioned problems, the present inventor intensively studied to discover that the above-mentioned problems can be resolved by setting the interval between sheath filaments which constitute steel cord having a (2+6) structure in a predetermined range, or optimizing the interval between sheath filaments which constitute steel cord having a (2+6) structure, and the cord interval.

In other words, the steel cord for reinforcing rubber articles of the present invention is a steel cord for reinforcing rubber articles comprising a core formed by arranging two core filaments in parallel without twisting the filaments together, and six sheath filaments twisted around the core, wherein, letting the diameter of the core filament dc (mm), the diameter of the sheath filament ds (mm) and sheath filament twist pitch p (mm), an average sheath filament interval D represented by the following Formula (I):

$$D=[L-6ds\{1+(L/p)^2\}^{1/2}]/6 \quad (I),$$

(where $L=(\pi+2)dc+\pi ds$) is from 25 to 80 μm.

The pneumatic tire of the present invention is a pneumatic tire having: a pair of bead portions; a pair of sidewall portions each extending to the outside of both the bead portions in the tire radial direction; and a tread portion extending between both the sidewall portions, and comprising; a carcass composed of at least one carcass ply which toroidally extends between the pair of bead portions and reinforces each of the portions; and a belt composed of at least one belt layer arranged on the outside of a crown portion of the carcass in the tire radial direction, wherein a steel cord for reinforcing rubber articles comprising a core formed by arranging two core filaments in parallel without twisting the filaments together, and six sheath filaments twisted around the core, wherein, letting the diameter of the core filament dc (mm), the diameter of the sheath filament ds (mm) and sheath filament twist pitch p (mm), an average sheath filament interval D represented by the following Formula (I):

$$D=[L-6ds\{1+(L/p)^2\}^{1/2}]/6 \quad (I),$$

(where $L=(\pi+2)dc+\pi ds$) is from 25 to 80 μm is used as reinforcing members for at least one of the belt layer.

Effects of the Invention

By the present invention, a steel cord for reinforcing rubber articles which has both rubber penetration and productivity and which allows to reduce the weight of a tire without compromising the strength of the tire when applied to a tire, and a pneumatic tire using the same, and in particular, a pneumatic tire in which weight reduction is achieved without reducing durability and productivity; a pneumatic tire in which weight reduction is achieved while improving steering stability, durability and productivity; a pneumatic tire which has excellent productivity and in which weight reduction is achieved while improving durability as compared to a conventional tire; and a pneumatic tire which has excellent durability and productivity and in which weight reduction is achieved can be provided.

MODES FOR CARRYING OUT THE INVENTION

In the following, suitable embodiments of the present invention will now be described in detail.

Figure 1:
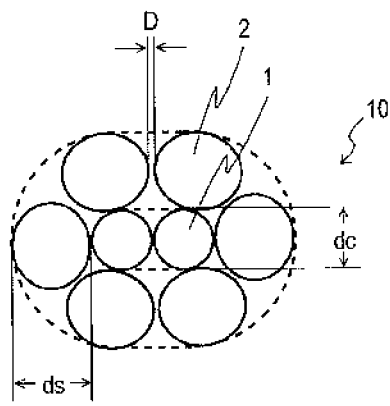
FIG. 1 is a sectional view steel cord for reinforcing rubber articles of one embodiment according to the present invention.

FIG. 1 is a sectional view of a steel cord for reinforcing rubber articles of the present invention. A steel cord for reinforcing rubber articles 10 of the present invention is composed of a core formed by arranging two core filaments in parallel without twisting the filaments together, and six sheath filaments twisted around the core. Two core filaments 1 are used because, if three or more core filaments 1 are used, it is difficult to arrange the filaments without substantially being twisted. By using six sheath filaments 2, rubber penetration to a center portion of steel cord 10 which is needed to ensure durability can be effectively ensured. When five or less sheath filaments are used, although the rubber penetration is favorable, the dispersibility of the sheath filament deteriorates and strength of the steel cord becomes insufficient. On the other hand, when seven or more sheath filaments are used, enough space for rubber penetration can not be ensured and the durability is decreased.

Here, viewed from the cross section of the steel cord, a core filament without being twisted has about a circle shape, while the cross sectional shape of the sheath filament is changed depending on the twist pitch. In other words, the steel cord has a characteristics that when the twist pitch becomes large, the cross section of the sheath filament gets close to a circle shape; and when the twist pitch becomes small, degree of eclipse (oblateness) of the cross section of the sheath filament becomes large. Accordingly, in the present invention, it is important that, letting the diameter of core filament 1 dc (mm), the diameter of sheath filament 2 ds (mm), and the sheath filament twist pitch p (mm), average sheath filament interval D represented by the following Formula (I):

$$D=[L-6ds\{1+(L/p)2\}^{1/2}]/6 \quad (I)$$

(where $L=(\pi+2)dc+\pi ds$) is from 25 to 80 μm. By employing the combination of diameter of core filament 1 dc, the diameter of sheath filament 2 ds, and the sheath filament twist pitch p such that the above formula (I) is satisfied, rubber penetration to the space of the sheath filament 2 can be sufficiently ensured, and at the same time, since the dispersibility is favorable, superfluous space is not generated and projection of filament or decrease in tenacity during bending deformation of the steel cord can be inhibited.

Figure 2:
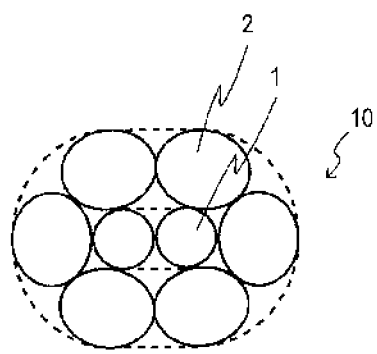
FIG. 2 is a sectional view of a steel cord in which D is smaller than 25 μm.
Figure 3:
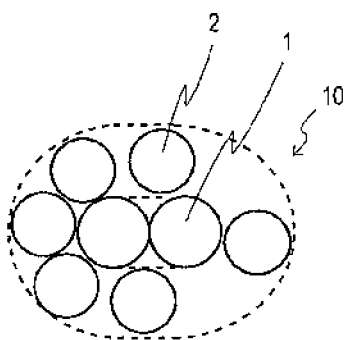
FIG. 3 is a sectional view of a steel cord in which D is larger than 80 μm.

When D is smaller than 25 μm, as shown, for example, in FIG. 2, the structure is such that rubber cannot be penetrated into space of the sheath filament 2, and water penetrates and spreads when belt is cut, which generates so-called cut separation. On the other hand, when D is larger than 80 μm, as shown, for example, in FIG. 3, since the sheath filaments 2 do not disperse uniformly around the core filament 1, the productivity deteriorates, as well as rubber does not sufficiently penetrate into area where sheath filaments are concentrated. This may lead to increased possibility of occurrence of projection of filament or decrease in tenacity. Suitably, the D is from 30 to 70 μm, and more suitably in a range of from 50 to 60 μm. By setting the value of D to such a range, balance between rubber penetration and dispersibility of the sheath filament 2 is optimally achieved.

In the present invention, the diameter of the core filament 1 dc and the diameter of the sheath filament 2 ds preferably satisfy the relationships represented by the following Formulae (II) to (IV):

$$dc < ds \qquad (II),$$

$$0.20 \leq dc \leq 0.32 \qquad (III), \text{ and}$$

$$0.27 \leq ds \leq 0.43 \qquad (IV).$$

In other words, the combination of the diameter of the core filament 1 dc and the diameter of the sheath filament ds in which they differ, in particular, in which the diameter of the core filament 1 dc is smaller than the diameter of the sheath filament ds is preferred. By this, the minor axis of the obtained steel cord having a flat shape can be made smaller compared with the case employing the combination of filaments of the same diameter. By satisfying the above-mentioned (III) and (IV), the steel cord can obtain a higher tenacity. Suitably, $0.23 \leq dc \leq 0.27$ and $0.30 \leq ds \leq 0.35$, and more suitably, $0.24 \leq dc \leq 0.26$ and $0.32 \leq ds \leq 0.34$. By setting the diameter of the core filament dc and the diameter of the sheath filament ds to such ranges, while maintaining rubber penetration and tenacity of the steel cord, weight reduction of a tire can be achieved in a good balance.

Further, in the present invention, the twist pitch p of the sheath filament is preferably from 5 to 18 mm. When the twist pitch of the sheath filament is smaller than 5 mm, space of the sheath filament cannot sufficiently ensured; on the other hand, when the twist pitch of the sheath filament is larger than 18 mm, the dispersibility of the sheath filament 2 tends to deteriorate, which is not preferable. On the other hand, when the twist pitch of the sheath filament p is from 5 to 18 mm, the productivity can be favorably improved. In order to favorably obtain the above-mentioned effect, the twist pitch of the sheath filament p is preferably from 10 to 16 mm.

Still further, when the steel cord of the present invention is used as a reinforcing material of a belt of a tire, the tensile modulus of elasticity of rubberized cord cut out from the tire is preferably 190 GPa or higher. By making the tensile modulus of elasticity of the rubberized cord cut out from the tire 190 GPa or higher, the hoop effect of the belt is sufficiently exhibited, and the shape retention of the tire or the steering stability can favorably be ensured. When the tensile modulus of elasticity of the rubberized cord cut out from the tire is smaller than 190 GPa, the steel cord may have an initial elongation during inflated to an inner pressure, which in some cases deteriorates the shape of the tire.

In the steel cord of the present invention, the minor axis is preferably from 0.85 to 1.05 mm. When the steel cord of the present invention is used as a reinforcing member of the belt of the tire, by making the minor axis of the steel cord 1.05 mm or smaller, the belt can be effectively made thin. When the minor axis is 1.00 mm or smaller, the weight reduction effect becomes large, which is more preferable. However, since when the minor axis is smaller than 0.85 mm, the amount of steel decreases considerably, in some cases, strength needed for a belt cannot be ensured.

The material of the steel filament used in the present invention is not particularly restricted, and any material can be used as long as they have been conventionally used. A high carbon steel having a carbon content of 0.80 mass % or higher is preferable. By employing a high carbon steel having a carbon content of 0.80 mass % or higher, the effect of the present invention can be favorably obtained. On the other hand, when the carbon content is above 1.5 mass %, the ductility is reduced and the fatigue resistance becomes poor, which is not preferable.

The surface of the steel cord of the present invention is preferably plated. The composition of the plating on the surface of the cord is not particularly restricted, and is suitably, brass plating composed of copper and zinc and more suitably, the content of copper is 60 mass % or higher. By this, the adhesion between the steel filament and rubber can be improved.

The material of the coating rubber used for the present invention is not particularly restricted, and known rubber can be used. Material having a Mooney viscosity of from 50 to 110 is suitable. When the Mooney viscosity is smaller than 50, the tire performance is reduced; when the Mooney viscosity is higher than 110, area where rubber is locally not sufficiently penetrated between sheath filaments is generated. Herein, the Mooney viscosity refers to a value obtained by performing a measurement according to JIS-K6300.

Next, the pneumatic tire of the present invention will be explained.

The pneumatic tire according to a first embodiment of the present invention relates to the improvement of the structure of the steel cord used as a reinforcing member of a belt, in which for at least one of the belt layer, a steel cord of the present invention is used as a reinforcing member. By this, weight reduction of a tire without compromising the strength of the tire can be possible. In the pneumatic tire according to the first embodiment of the present invention, other structures and materials are not particularly limited and known structures and materials can appropriately be employed.

Figure 4:
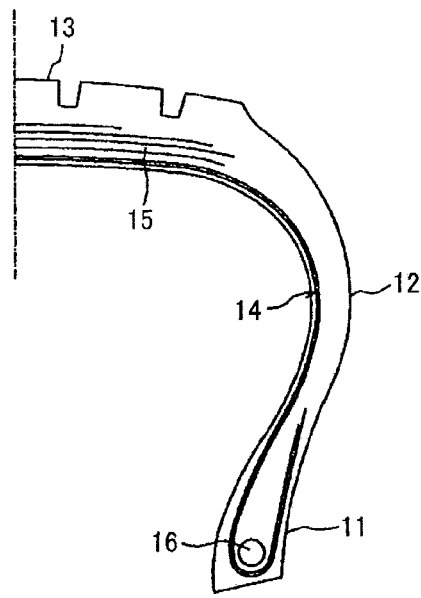
FIG. 4 is half sectional views of pneumatic tires according to a first embodiment and the fifth embodiment of the present invention.

FIG. 4 is a half sectional view of a pneumatic tire of the first embodiment and fifth embodiment (below-mentioned) of the present invention. The tire illustrated in FIG. 4 has: a pair of bead portions 11; a pair of sidewall portions 12 each extending to the outside of both the bead portions in the tire radial direction; and a tread portion 13 extending between both the sidewall portions 12, and comprising; a carcass 14 composed of at least one (in the illustrated example, two) carcass ply which toroidally extends between the pair of bead portions 11 and reinforces each of the portions 11, 12, 13; and a belt 15 composed of at least one (in the illustrated example, four) belt layer arranged on the outside of a crown portion of the carcass 14 in the tire radial direction.

The illustrated carcass 14 is constituted by two turn-up carcass plies, and the turn-up carcass ply is composed of a body portion toroidally extending between a pair of bead cores 16 each embedded in the bead portion 11, and a turn-up portion which is rolled up around each bead core 16 from the inside to the outside in the tire width direction outward in the tire radial direction. The number of plies and the structure of the carcass 14 are not limited thereto.

Since the pneumatic tire according to the first embodiment of the present invention, as mentioned above, is lightweight and has excellent durability, the tire is suitable particularly for a tire for a light truck and a tire for a truck or a bus. In the pneumatic tire according to the first embodiment of the present invention, as a gas for filling the tire, a normal air or an air in which the oxygen partial pressure is varied, or an inert gas such as nitrogen can be used.

Next, a pneumatic tire according to a second embodiment of the present invention will be described in detail.

Figure 5:
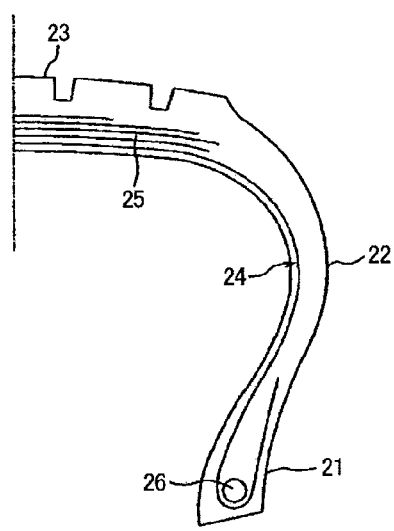
FIG. 5 is a half sectional view of a pneumatic tire according to the second embodiment and the fifth embodiment of the present invention.

FIG. 5 is a half sectional view of a pneumatic tire of the second embodiment of the present invention. The tire illustrated in FIG. 5 has: a pair of bead portions 21; a pair of sidewall portions 22 each extending to the outside of both the bead portions in the tire radial direction; and a tread portion 23 extending between both the sidewall portions 22, and comprising; a carcass 24 composed of at least one (in the illustrated example, one) carcass ply which toroidally extends between the pair of bead portions 21 and reinforces each of the portions 21, 22, 23; and a belt 25 composed of at least two (in the illustrated example, four) cross belt layers arranged on the outside of a crown portion of the carcass 24 in the tire radial direction.

The illustrated carcass 24 is constituted by two turn-up carcass plies, and the turn-up carcass ply is composed of a body portion toroidally extending between a pair of bead cores 26 each embedded in the bead portion 21, and a turn-up portion which is rolled up around each bead core 26 from the inside to the outside in the tire width direction outward in the tire radial direction. The number of plies and the structure of the carcass 24 are not limited thereto.

In the pneumatic tire according to the second embodiment of the present invention, as at least one reinforcing material of the cross belt layer, the above-mentioned steel cord for reinforcing rubber articles of the present invention is used. By using a flat steel cord having such a structure as a reinforcing material of the belt, weight reduction of the tire can be achieved without reducing the durability and productivity.

In the pneumatic tire according to the second embodiment of the present invention, the interval of neighboring steel cords in the cross belt is from 0.50 mm to 1.40 mm. When the steel cord interval is less than 0.50 mm, peel of the belt layer caused by progression of a crack generated at the end of the steel cord, so-called, belt edge separation (BES) considerably deteriorates. On the other hand, when the steel cord interval is larger than 1.40 mm, the end count of the steel cord is too small and sufficient strength for a tire cannot be obtained. Preferably, the steel cord interval is from 0.70 mm to 1.20 mm.

In the pneumatic tire according to the second embodiment of the present invention, the diameter of the core filament 1 dc and the diameter of the sheath filament 2 ds preferably satisfy the relationships represented by the following Formulae (II) to (IV):

$$dc < ds \quad (II),$$

$$0.20 \leq dc \leq 0.32 \quad (III), \text{ and}$$

$$0.27 \leq ds \leq 0.43 \quad (IV).$$

In other words, the combination of the diameter of the core filament 1 dc and the diameter of the sheath filament 2 ds in which they differ, in particular, in which the diameter of the core filament 1 dc is smaller than the diameter of the sheath filament ds is preferred. By this, the minor axis of the obtained steel cord having a flat shape can be made smaller compared with the case employing the combination of filaments of the same diameter. By satisfying the above-mentioned (III) and (IV), the steel cord can obtain a higher tenacity. Suitably, $0.23 \leq dc \leq 0.27$ and $0.30 \leq ds \leq 0.35$, and more suitably, $0.24 \leq dc \leq 0.26$ and $0.32 \leq ds \leq 0.34$. By setting the diameter of the core filament dc and the diameter of the sheath filament ds to such ranges, while maintaining rubber penetration and tenacity of the steel cord, weight reduction of a tire can be achieved in a good balance.

Further, in the pneumatic tire according to the second embodiment of the present invention, the thickness of the belt layer is preferably from 1.30 mm to 1.65 mm. When the thickness of the belt layer is less than 1.30 mm, a sufficient durability may not be obtained, which is not preferable. On the other hand, when the thickness of the belt layer is larger than 1.65 mm, tire weight reduction effect may not be obtained, which is not preferable. From the viewpoint of weight reduction of a tire, the thickness of the belt layer is suitably from 1.40 mm to 1.55 mm.

Still further, in the pneumatic tire according to the second embodiment of the present invention, the twist pitch p of the sheath filament 2 is preferably from 5 to 18 mm. When the twist pitch of the sheath filament 2 is smaller than 5 mm, space of the sheath filament 2 cannot sufficiently ensured; on the other hand, when the twist pitch of the sheath filament 2 is larger than 18 mm, the dispersibility of the sheath filament 2 tends to deteriorate, which is not preferable. On the other hand, when the twist pitch of the sheath filament 2 p is from 5 to 18 mm, the productivity can be favorably improved. In order to favorably obtain the above-mentioned effect, the twist pitch of the sheath filament 2 p is preferably from 10 to 16 mm.

In the pneumatic tire according to the second embodiment of the present invention, after vulcanization molding of the tire, the tensile modulus of elasticity of rubberized steel cord cut out from the tire is preferably 190 GPa or higher. By making the tensile modulus of elasticity of the rubberized steel cord cut out from the tire 190 GPa or higher, the hoop effect of the belt is sufficiently exhibited, and the shape retention of the tire or the steering stability can favorably be ensured. When the tensile modulus of elasticity of the rubberized cord cut out from the tire is smaller than 190 GPa, the steel cord may have an initial elongation during inflated to an inner pressure, which in some cases deteriorates the shape of the tire.

Further, in the pneumatic tire according to the second embodiment of the present invention, the minor axis of the steel cord is preferably from 0.85 mm to 1.05 mm. By making the minor axis of the steel cord 1.05 mm or smaller, the belt can be effectively made thin. When the minor axis is 1.00 mm or smaller, the weight reduction effect becomes large, which is more preferable. However, since when the minor axis is smaller than 0.85 mm, the amount of steel decreases considerably, in some cases, strength needed for a belt cannot be ensured.

The pneumatic tire according to a second embodiment of the present invention may be any tire as long as the tire has a belt having at least two cross belt layers, and at least one reinforcing material of the cross belt layer is a steel cord composed of a core formed by arranging two core filaments in parallel without twisting the filaments together, and six sheath filaments twisted around the core, wherein the average diameter of sheath filament D satisfies the above relationship, and the interval between the neighboring steel cords is from 0.50 mm to 1.40 mm. The number of belt layers and the structure thereof are not particularly restricted thereto.

The material of the steel filament used in the pneumatic tire according to the second embodiment of the present invention is not particularly restricted, and any material can be used as long as they have been conventionally used. A high carbon steel having a carbon content of 0.80 mass % or higher is preferable. By employing a high carbon steel having a carbon content of 0.80 mass % or higher, the effect of the present invention can be favorably obtained. On the other hand, when the carbon content is above 1.5 mass %, the ductility is reduced and the fatigue resistance becomes poor, which is not preferable.

The surface of the steel cord of the pneumatic tire according to a second embodiment of the present invention is preferably plated. The composition of the plating on the surface of the cord is not particularly restricted, and is suitably, brass plating composed of copper and zinc and more suitably, the content of copper is 60 mass % or higher. By this, the adhesion between the steel filament and rubber can be improved.

Further, in the pneumatic tire according to the second embodiment of the present invention, the material of the coating rubber of the steel cord of the present invention mentioned above is not particularly restricted, and known rubber can be used. Material having a Mooney viscosity of from 50 to 110 is suitable. When the Mooney viscosity is smaller than 50, the tire performance is reduced; when the Mooney viscosity is higher than 110, area where rubber is locally not sufficiently penetrated between sheath filaments is generated. Herein, the Mooney viscosity refers to a value obtained by performing a measurement according to JIS-K6300.

Since the pneumatic tire according to the second embodiment of the present invention, as mentioned above, is lightweight and has excellent durability, the tire is suitable particularly for a tire for a light truck and a tire for a truck or a bus. In the pneumatic tire according to the present invention, as a gas for filling the tire, a normal air or an air in which the oxygen partial pressure is varied, or an inert gas such as nitrogen can be used.

Next, a pneumatic tire according to a third embodiment of the present invention will be described in detail.

Figure 6:
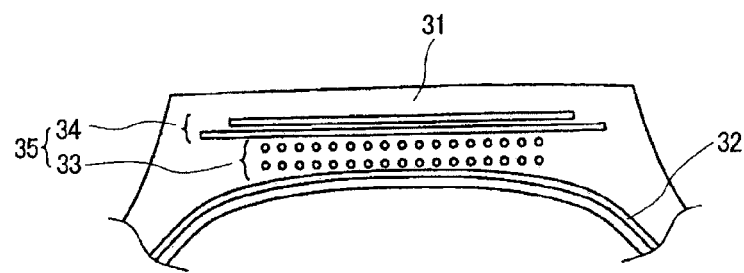
FIG. 6 is an enlarged cross-sectional view of the vicinity of a tread portion of a pneumatic tire according to a third embodiment of the present invention.

FIG. 6 is an enlarged cross-sectional view of the vicinity of a tread portion of a pneumatic tire of the third embodiment of the present invention. The tire illustrated in FIG. 6 has: a pair of bead portions (not illustrated); a pair of sidewall portions (not illustrated) each extending to the outside of both the bead portions in the tire radial direction; and a tread portion 31 extending between both the sidewall portions 22, and comprising; and a carcass 32 composed of at least one (in the illustrated example, one) carcass ply which toroidally extends between the pair of bead portions and reinforces each of the portions.

The illustrated carcass 32 is constituted by one turn-up carcass ply, and the turn-up carcass ply is composed of a body portion toroidally extending between a pair of bead cores (not illustrated) each embedded in the bead portion, and a turn-up portion which is rolled up around each bead core from the inside to the outside in the tire width direction outward in the tire radial direction. The number of plies and the structure of the carcass 32 are not limited thereto.

The pneumatic tire according to the third embodiment of the present invention comprises, on the outside of the crown portion of the carcass 32 in the tire radial direction, a belt 35 having at least one circumferential direction belt layer 33 in which a steel cord extending along the tire equatorial plane is coated with rubber, and at least one inclined belt layer 34 in which a steel cord extending in an inclined direction with respect to the tire equatorial plane is coated with rubber. By providing at least one circumferential direction belt layer 33, diameter growth when inflated to an inner pressure can be inhibited and the shape of the tire can be retained, as well as, the steering stability can be improved. Suitably, the circumferential direction belt layer 33 is used as an innermost belt layer. At least one inclined belt layer 34 is preferably a cross belt in which belts are laminated such that cords are crossed each other sandwiching the tire equatorial plane. By arranging the circumferential direction belt layer 33 and the cross belt layer 34, the steering stability can be more improved.

The initial elongation amount of the steel cord constituting the circumferential direction belt layer 33 is preferably from 0.3% to 3.0%. When the initial elongation amount of the steel cord is less than 0.3%, the steel cord is fully-stretched when inflated to an inner pressure and during diameter growth, whereby the tire is buckled and does not have a normal shape, which leads to deterioration of uneven wear. On the other hand, when the initial elongation strain amount of the steel cord is larger than 3.0%, the diameter growth due to the inner pressure becomes too large. By this, the tread rubber on the surface of the tire becomes in a stretched state, causing disadvantages of deterioration of wear resistance or cut resistant property. Examples of a steel cord having an initial elongation amount of 0.3% to 3.0% include a steel cord having a wave form or a spiral form, an open twisted cord, and a so-called high-elongation cord in which a plurality of filaments are loosely twisted together. The cord structure of the steel cord which constitutes the circumferential direction belt layer 3 is not particularly restricted.

In the pneumatic tire according to the third embodiment of the present invention, as a steel cord of at least one inclined belt layer 34, the above-mentioned steel cord for reinforcing rubber articles of the present invention is used. By using a flat steel cord having such a structure as a reinforcing material of the belt, weight reduction of the tire can be achieved without reducing the durability and productivity.

Also in the pneumatic tire according to the third embodiment of the present invention, the diameter of the core filament 1 dc and the diameter of the sheath filament 2 ds preferably satisfy the relationships represented by the following Formulae (II) to (IV):

$$dc < ds \quad \text{(II)},$$

$$0.20 \leq dc \leq 0.32 \quad \text{(III), and}$$

$$0.27 \leq ds \leq 0.43 \quad \text{(IV)}.$$

In other words, the combination of the diameter of the core filament 1 dc and the diameter of the sheath filament 2 ds in which they differ, in particular, in which the diameter of the core filament 1 dc is smaller than the diameter of the sheath filament ds is preferred. By this, the minor axis of the obtained steel cord having a flat shape can be made smaller compared with the case employing the combination of filaments of the same diameter. By satisfying the above-mentioned (III) and (IV), the steel cord can obtain a higher tenacity. Suitably, $0.23 \leq dc \leq 0.27$ and $0.30 \leq ds \leq 0.35$, and more suitably, $0.24 \leq dc \leq 0.26$ and $0.32 \leq ds \leq 0.34$. By setting the diameter of the core filament dc and the diameter of the sheath filament ds to such ranges, while maintaining rubber penetration and tenacity of the steel cord, weight reduction of a tire can be achieved in a good balance.

Further, in the pneumatic tire according to the third embodiment of the present invention, the thickness of the belt layer is preferably from 1.30 mm to 1.65 mm. When the thickness of the belt layer is less than 1.30 mm, a sufficient durability may not be obtained, which is not preferable. On the other hand, when the thickness of the belt layer is larger than 1.65 mm, tire weight reduction effect may not be obtained, which is not preferable. From the viewpoint of weight reduction of a tire, the thickness of the belt layer is suitably from 1.40 mm to 1.55 mm.

Still further, also in the pneumatic tire according to the third embodiment of the present invention, the twist pitch p of the sheath filament 2 is preferably from 5 to 18 mm. When the twist pitch of the sheath filament 2 is smaller than 5 mm, space of the sheath filament cannot sufficiently ensured; on the other hand, when the twist pitch of the sheath filament 2 is larger than 18 mm, the dispersibility of the sheath filament 2 tends to deteriorate, which is not preferable. On the other hand, when the twist pitch of the sheath filament 2 p is from 5 to 18 mm, the productivity can be favorably improved. In order to favorably obtain the above-mentioned effect, the twist pitch of the sheath filament 2 p is preferably from 10 to 16 mm.

Also in the pneumatic tire according to the third embodiment of the present invention, after vulcanization molding of the tire, the tensile modulus of elasticity of rubberized steel cord cut out from the tire is preferably 190 GPa or higher. By making the tensile modulus of elasticity of the rubberized steel cord cut out from the tire 190 GPa or higher, the in-plane rigidity (rigidity in the tire contact surface) of the belt can be improved, and the steering stability can favorably be ensured. When the tensile modulus of elasticity of the rubberized cord cut out from the tire is smaller than 190 GPa, the in-plane rigidity of the belt is in some cases not sufficiently exhibited, and the steering stability may deteriorate.

Further, in the pneumatic tire according to the third embodiment of the present invention, the minor axis of the steel cord is preferably from 0.85 mm to 1.05 mm. By making the minor axis of the steel cord 1.05 mm or smaller, the belt can be effectively made thin. When the minor axis is 1.00 mm or smaller, the weight reduction effect becomes large, which is more preferable. However, since when the minor axis is smaller than 0.85 mm, the amount of steel decreases considerably, in some cases, strength needed for a belt cannot be ensured.

Still further, also in the pneumatic tire according to the third embodiment of the present invention, the interval of neighboring steel cords is preferably from 0.50 mm to 1.40 mm. When the steel cord interval is less than 0.50 mm, peel of the belt layer caused by progression of a crack generated at the end of the steel cord, so-called, belt edge separation may considerably deteriorate. On the other hand, when the steel cord interval is larger than 1.40 mm, the end count of the steel cord is too small and sufficient strength for a tire cannot be obtained in some cases. Preferably, the steel cord interval is from 0.70 mm to 1.20 mm.

Also in the pneumatic tire according to the third embodiment of the present invention, the material of the steel filament is not particularly restricted, and any material can be used as long as they have been conventionally used. A high carbon steel having a carbon content of 0.80 mass % or higher is preferable. By employing a high carbon steel having a carbon content of 0.80 mass % or higher, the effect of the present invention can be favorably obtained. On the other hand, when the carbon content is above 1.5 mass %, the ductility is reduced and the fatigue resistance becomes poor, which is not preferable.

Also in the pneumatic tire according to the third embodiment of the present invention, the surface of the steel cord is preferably plated. The composition of the plating on the surface of the cord is not particularly restricted, and is suitably, brass plating composed of copper and zinc and more suitably, the content of copper is 60 mass % or higher. By this, the adhesion between the steel filament and rubber can be improved.

Further, also in the pneumatic tire according to the third embodiment of the present invention, the material of the coating rubber of the steel cord of the present invention mentioned above is not particularly restricted, and known rubber can be used. Material having a Mooney viscosity of from 50 to 110 is suitable. When the Mooney viscosity is smaller than 50, the tire performance is reduced; when the Mooney viscosity is higher than 110, area where rubber is locally not sufficiently penetrated between sheath filaments is generated. Herein, the Mooney viscosity refers to a value obtained by performing a measurement according to JIS-K6300.

Since the pneumatic tire according to the third embodiment of the present invention, as mentioned above, is lightweight and has excellent steering stability and durability, the tire is suitable particularly for a tire for a light truck and a tire for a truck or a bus. In the pneumatic tire according to the present invention, as a gas for filling the tire, a normal air or an air in which the oxygen partial pressure is varied, or an inert gas such as nitrogen can be used.

Next, a pneumatic tire according to a fourth embodiment of the present invention will be described.

Figure 7:
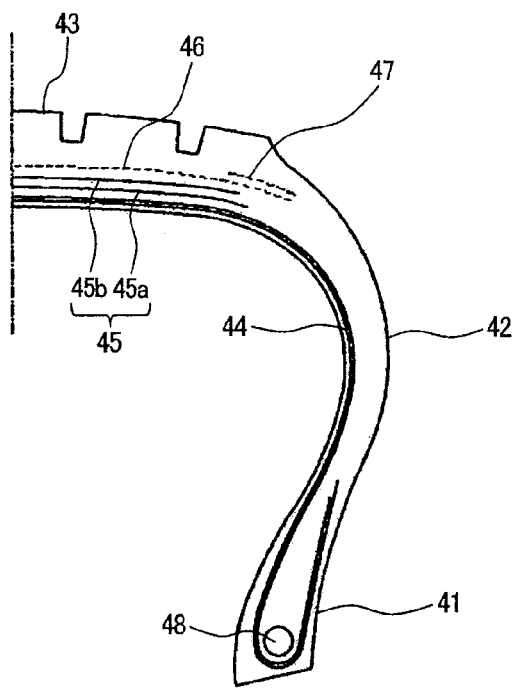
FIG. 7 is a half sectional view of a pneumatic tire according to the fourth embodiment of the present invention.

FIG. 7 is a half sectional view of a pneumatic tire of the fourth embodiment of the present invention. The tire illustrated in FIG. 7 has: a pair of bead portions 41; a pair of sidewall portions 42 each extending to the outside of both the head portions in the tire radial direction; and a tread portion 43 extending between both the sidewall portions 42, and having; a carcass 44 composed of at least one (in the illustrated example, two) carcass ply which toroidally extends between the pair of bead portions 41 and reinforces each of the portions 41, 42, 43; and a belt 45 composed of at least one (in the illustrated example, two) belt layer, belt layer 45a, 45b, arranged on the outside of a crown portion of the carcass 44 in the tire radial direction, and, in the illustrated example, comprising on the outside of the belt layers 45a, 45b in the tire radial direction, a cap layer 46 arranged over the whole width of the belt layers 45a, 45b, and a layered layer 47 arranged on the both end regions of the belt.

The illustrated carcass 44 is constituted by two turn-up carcass plies, and the turn-up carcass ply is composed of a body portion toroidally extending between a pair of bead cores 48 each embedded in the bead portion 41, and a turn-up portion which is rolled up around each bead core 48 from the inside to the outside in the tire width direction outward in the tire radial direction. The number of plies and the structure of the carcass 44 are not limited thereto. The belt 45 is suitably a cross belt in which belts are laminated such that steel cords are crossed each other sandwiching the tire equatorial plane.

In the pneumatic tire according to the fourth embodiment of the present invention, as a steel cord constituting the belt layer, the above-mentioned steel cord for reinforcing rubber articles of the present invention is used. By using a flat steel cord having such a structure as a reinforcing material of the belt, weight reduction of the tire can be achieved without reducing the durability and productivity.

In the pneumatic tire according to the fourth embodiment of the present invention, the diameter of the core filament 1 dc and the diameter of the sheath filament 2 ds preferably satisfy the relationships represented by the following Formulae (II) to (IV):

$$dc < ds \quad \text{(II),}$$

$$0.20 \leq dc \leq 0.32 \quad \text{(III), and}$$

$$0.27 \leq ds \leq 0.43 \quad \text{(IV).}$$

In other words, the combination of the diameter of the core filament 1 dc and the diameter of the sheath filament 2 ds in which they differ, in particular, in which the diameter of the core filament 1 dc is smaller than the diameter of the sheath filament ds is preferred. By this, the minor axis of the obtained steel cord having a flat shape can be made smaller compared with the case employing the combination of filaments of the same diameter. By satisfying the above-mentioned (III) and (IV), the steel cord can obtain a higher tenacity. Suitably, $0.23 \leq dc \leq 0.27$ and $0.30 \leq ds \leq 0.35$, and more suitably, $0.24 \leq dc \leq 0.26$ and $0.32 \leq ds \leq 0.34$. By setting the diameter of the core filament dc and the diameter of the sheath filament ds to such ranges, while maintaining rubber penetration and tenacity of the steel cord, weight reduction of a tire can be achieved in a good balance.

In the pneumatic tire according to the fourth embodiment of the present invention, a cap layer 46 composed of a non-metal cord rubberized layer arranged substantially parallel to the tire circumferential direction which cap layer is arranged on the outside of the belt layer 45a, 45b in the tire radial direction over the whole width of the belt layer 45a, 45b and/or a layered layer 47 composed of a non-metal cord rubberized layer arranged substantially parallel to the tire circumferential direction which layered layer is arranged on the both end regions of the belt layer 45a, 45b is/are arranged as a belt reinforcing layer(s) (see, FIG. 7). Since there is a belt reinforcing layer arranged in the circumferential direction of the tire, the tire can sufficiently be used under a high inner pressure or a high load.

As the non-metal cord, a twisted cord composed of, for example, polyamide such as nylon or aramid, polyester such as polyethylene naphthalate (PEN) or polyethylene terephthalate (PET), organic fiber such as rayon, polyketone or vinylon can be suitably used. The end count can be appropriately determined in view of the combination with the constitution of the belt cord.

In the pneumatic tire according to the fourth embodiment of the present invention, the thickness of the belt layer is preferably from 1.30 mm to 1.65 mm. When the thickness of the belt layer is less than 1.30 mm, a sufficient durability may not be obtained, which is not preferable. On the other hand, when the thickness of the belt layer is larger than 1.65 mm, tire weight reduction effect may not be obtained, which is not preferable. From the viewpoint of weight reduction of a tire, the thickness of the belt layer is suitably from 1.40 mm to 1.55 mm.

In the pneumatic tire according to the fourth embodiment of the present invention, the twist pitch p of the sheath filament 2 is preferably 18 mm or smaller. When the twist pitch of the sheath filament 2 is larger than 18 mm, the dispersibility of the sheath filament 2 tends to deteriorate, which is not preferable. On the other hand, when the twist pitch of the sheath filament 2 is 18 mm or smaller, the productivity can be more improved. In order to favorably obtain the above-mentioned effect, the twist pitch of the sheath filament 2 is preferably 16 mm or smaller. When the twist pitch is smaller than 1 mm, it is difficult to manufacture the steel cord, which is not preferable.

Further, also in the pneumatic tire according to the third embodiment of the present invention, after vulcanization molding of the tire, the tensile modulus of elasticity of rubberized steel cord cut out from the tire is preferably 190 GPa or higher. This is because the tire for a light truck is often used under a higher inner pressure compared to a tire for an automobile, and the tensile modulus of elasticity of the steel cord is preferably high. By making the tensile modulus of elasticity of the rubberized steel cord cut out from the tire 190 GPa or higher, the in-plane rigidity (rigidity in the tire contact surface) of the belt can be improved, and the belt durability can favorably be improved. Since the belt rigidity improves, a tension load applied to the belt reinforcing layer using the non-metal cord can be reduced and a failure originated from the non-metal cord can be prevented. On the other hand, when the tensile modulus of elasticity of the rubberized cord cut out from the tire is smaller than 190 GPa, the in-plane rigidity of the belt is in some cases not sufficiently exhibited, and the steering stability may deteriorate.

Still further, in the pneumatic tire according to the fourth embodiment of the present invention, the minor axis of the steel cord is preferably from 0.85 mm to 1.05 mm. By making the minor axis of the steel cord 1.05 mm or smaller, the belt can be effectively made thin. When the minor axis is 1.00 mm or smaller, the weight reduction effect becomes large, which is more preferable. However, since when the minor axis is smaller than 0.85 mm, the amount of steel decreases considerably, in some cases, strength needed for a belt cannot be ensured.

Also in the pneumatic tire according to the fourth embodiment of the present invention, the interval of neighboring steel cords is preferably from 0.50 mm to 1.40 mm. When the steel cord interval is less than 0.50 mm, peel of the belt layer caused by progression of a crack generated at the end of the steel cord, so-called, belt edge separation may considerably deteriorate. Preferably, the steel cord interval is from 0.70 mm to 1.20 mm. On the other hand, when the steel cord interval is larger than 1.40 mm, the end count of the steel cord is too small and sufficient strength for a tire cannot be obtained in some cases.

Also in the pneumatic tire according to the fourth embodiment of the present invention, the material of the steel filament is not particularly restricted, and any material can be used as long as they have been conventionally used. A high carbon steel having a carbon content of 0.80 mass % or higher is preferable. By employing a high carbon steel having a carbon content of 0.80 mass % or higher, the effect of the present invention can be favorably obtained. On the other hand, when the carbon content is above 1.5 mass %, the ductility is reduced and the fatigue resistance becomes poor, which is not preferable.

Further, also in the steel cord of the pneumatic tire according to the fourth embodiment of the present invention, the surface of the steel cord is preferably plated. The composition of the plating on the surface of the cord is not particularly restricted, and is suitably, brass plating composed of copper and zinc and more suitably, the content of copper is 60 mass % or higher. By this, the adhesion between the steel filament and rubber can be improved.

Still further, also in the pneumatic tire according to the fourth embodiment of the present invention, the material of the coating rubber of the steel cord of the present invention mentioned above is not particularly restricted, and known rubber can be used. Material having a Mooney viscosity of from 50 to 110 is suitable. When the Mooney viscosity is smaller than 50, the tire performance is reduced; when the Mooney viscosity is higher than 110, area where rubber is locally not sufficiently penetrated between sheath filaments is generated. Herein, the Mooney viscosity refers to a value obtained by performing a measurement according to JIS-K6300.

Since the pneumatic tire according to the fourth embodiment of the present invention, as mentioned above, is lightweight and has excellent durability, the tire is suitable particularly for a tire for a light truck and a tire for a truck or a bus. In the pneumatic tire according to the present invention, as a gas for filling the tire, a normal air or an air in which the oxygen partial pressure is varied, or an inert gas such as nitrogen can be used.

Subsequently, a pneumatic tire according to a fifth embodiment of the present invention will be described again by using FIG. 4.

FIG. 4 is a half sectional view of a pneumatic tire of the first embodiment (mentioned above) and fifth embodiment of the present invention. The tire illustrated in FIG. 4 has: a pair of bead portions 11; a pair of sidewall portions 12 each extending to the outside of both the bead portions in the tire radial direction; and a tread portion 13 extending between both the sidewall portions 12, and comprising: a carcass 14 composed of at least one (in the illustrated example, two) carcass ply which toroidally extends between the pair of bead portions 11 and reinforces each of the portions 11, 12, 13; and a belt 15 composed of at least three (in the illustrated example, four) belt layers arranged on the outside of a crown portion of the carcass 14 in the tire radial direction.

The illustrated carcass 14 is constituted by one turn-up carcass ply, and the turn-up carcass ply is composed of a body portion toroidally extending between a pair of bead cores 16 each embedded in the bead portion 11, and a turn-up portion which is rolled up around each bead core 16 from the inside to the outside in the tire width direction outward in the tire radial direction. The number of plies and the structure of the carcass 14 are not limited thereto.

In the pneumatic tire according to the fifth embodiment of the present invention, as the steel cord constituting the outermost belt layer of the belt, the above-mentioned steel cord for reinforcing rubber articles of the present invention is used. By using a flat steel cord having such a structure as a reinforcing material of the outermost belt layer, weight reduction of the tire can be achieved without reducing the durability and productivity.

Also in the pneumatic tire according to the fifth embodiment of the present invention, the diameter of the core filament 1 dc and the diameter of the sheath filament 2 ds preferably satisfy the relationships represented by the following Formulae (II) to (IV):

$$dc < ds \quad \text{(II)},$$

$$0.20 \leq dc \leq 0.32 \quad \text{(III), and}$$

$$0.27 \leq ds \leq 0.43 \quad \text{(IV)}.$$

In other words, the combination of the diameter of the core filament 1 dc and the diameter of the sheath filament 2 ds in which they differ, in particular, in which the diameter of the core filament 1 dc is smaller than the diameter of the sheath filament ds is preferred. By this, the minor axis of the obtained steel cord having a flat shape can be made smaller compared with the case employing the combination of filaments of the same diameter. By satisfying the above-mentioned (III) and (IV), the steel cord can obtain a higher tenacity. Suitably, $0.23 \leq dc \leq 0.27$ and $0.30 \leq ds \leq 0.35$, and more suitably, $0.24 \leq dc \leq 0.26$ and $0.32 \leq ds \leq 0.34$. By setting the diameter of the core filament dc and the diameter of the sheath filament ds to such ranges, while maintaining rubber penetration and tenacity of the steel cord, weight reduction of a tire can be achieved in a good balance.

The pneumatic tire according to the fifth embodiment of the present invention has a cross belt layer laminated such that cords are crossed each other sandwiching the tire equatorial plane, other than the outermost belt layer, and the cord diameter of the steel cord constituting the cross belt is larger than that of the minor axis of the steel cord constituting the outermost belt layer. By this, a sufficient strength for a tire can be obtained. As a steel cord constituting the cross belt layer, a layer-twisted steel cord or a multi-twisted steel cord can be suitably used. Examples of the layer-twisted steel cord include a (2+8) structure and a (3+9+15) structure; and examples of the multi-twisted steel cord include a 7×(1+6) structure and a 7×(3+9+15) structure.

Further, in the pneumatic tire according to the fifth embodiment of the present invention, the thickness of the outermost belt layer is preferably from 1.30 mm to 1.65 mm. When the thickness of the outermost belt layer is less than 1.30 mm, a sufficient durability may not be obtained, which is not preferable. On the other hand, when the thickness of the outermost belt layer is larger than 1.65 mm, tire weight reduction effect may not be obtained, which is not preferable. From the viewpoint of weight reduction of a tire, the thickness of the belt layer is suitably from 1.40 mm to 1.55 mm.

Still further, in the pneumatic tire according to the fifth embodiment of the present invention, the twist pitch of the sheath filament 2 of the steel cord constituting the outermost belt layer is preferably from 5 to 18 mm. When the twist pitch of the sheath filament 2 is smaller than 5 mm, space of the sheath filament cannot sufficiently ensured; on the other hand, when the twist pitch of the sheath filament 2 is larger than 18 mm, the dispersibility of the sheath filament 2 tends to deteriorate, which is not preferable. On the other hand, when the twist pitch of the sheath filament 2 is from 5 to 18 mm, the productivity can be more improved. In order to favorably obtain the above-mentioned effect, the twist pitch of the sheath filament 2 is preferably from 10 to 16 mm.

Also in the pneumatic tire according to the fifth embodiment of the present invention, the minor axis of the steel cord constituting the outermost belt layer is preferably from 0.85 mm to 1.05 mm. By making the minor axis of the steel cord 1.05 mm or smaller, the belt can be effectively made thin. When the minor axis is 1.00 mm or smaller, the weight reduction effect becomes large, which is more preferable. However, since when the minor axis is smaller than 0.85 mm, the amount of steel decreases considerably, in some cases, strength needed for a belt cannot be ensured.

Further, in the pneumatic tire according to the fifth embodiment of the present invention, the interval of neighboring steel cords in the outermost belt layer is preferably from 0.50 mm to 1.80 mm. When the steel cord interval is less than 0.50 mm, peel of the belt layer caused by progression of a crack generated at the end of the steel cord, so-called, belt edge separation may considerably deteriorate. On the other hand, when the steel cord interval is larger than 1.80 mm, the end count of the steel cord is too small and sufficient strength for a tire cannot be obtained in some cases. Preferably, the steel cord interval is from 0.70 mm to 1.50 mm.

Also in the pneumatic tire according to the fifth embodiment of the present invention, the material of the steel filament is not particularly restricted, and any material can be used as long as they have been conventionally used. A high carbon steel having a carbon content of 0.80 mass % or higher is preferable. By employing a high carbon steel having a carbon content of 0.80 mass % or higher, the effect of the present invention can be favorably obtained. On the other hand, when the carbon content is above 1.5 mass %, the ductility is reduced and the fatigue resistance becomes poor, which is not preferable.

The surface of the steel cord of the pneumatic tire according to a fifth embodiment of the present invention is preferably plated. The composition of the plating on the surface of the cord is not particularly restricted, and is suitably, brass plating composed of copper and zinc and more suitably, the content of copper is 60 mass % or higher. By this, the adhesion between the steel filament and rubber can be improved.

Further, also in the pneumatic tire according to the fifth embodiment of the present invention, the material of the coating rubber of the steel cord of the present invention mentioned above is not particularly restricted, and known rubber can be used. Material having a Mooney viscosity of from 50 to 110 is suitable. When the Mooney viscosity is smaller than 50, the tire performance is reduced; when the Mooney viscosity is higher than 110, area where rubber is locally not sufficiently penetrated between sheath filaments is generated. Herein, the Mooney viscosity refers to a value obtained by performing a measurement according to JIS-K6300.

Since the pneumatic tire according to the fifth embodiment of the present invention, as mentioned above, is lightweight and has excellent durability, the tire is suitable particularly for a tire for a light truck and a tire for a truck or a bus and a tire for a construction vehicle. In the pneumatic tire according to the present invention, as a gas for filling the tire, a normal air or an air in which the oxygen partial pressure is varied, or an inert gas such as nitrogen can be used.

EXAMPLES

In the following, the present invention will be described in detail by way of Examples.

Examples 1-1 to 1-9, Comparative Examples 1-1 to 1-8 and Conventional Example 1

Tires of types as shown in FIG. 4 were manufactured in a tire size of 11R22.5/14PR. A belt was composed of four belt layers; the second belt layer and the third belt layer (a second layer and a third layer from inside in the tire radial direction) formed a main cross layer; and each of steel cords as shown in Tables 1 to 4 was applied to a tire as a reinforcing member. For the obtained test tires, the rubber penetration, diameter growth and belt weight thereof were evaluated according to the below-mentioned procedure. At the same time, the productivities of the steel cords were also evaluated. The tensile modulus of elasticity of each rubberized cord cut out from the tires was calculated by the below-mentioned procedure.

<Tensile Modulus of Elasticity of Cord>

Steel cords of Examples 1-1 to 1-9, Comparative Examples 1-1 to 1-8 and conventional Example 1 were dissected and picked out from the tires, and then superfluous rubber attached to the surface of the cord at a grip portion was removed to perform a tensile test by a cord tensile tester. In this case, the tensile strain was measured by a video extensometer. In the measurement, the distance between marks was 100 mm, and the tensile test speed was 10 mm/min. On the obtained stress-strain curve, the slope between two points, a stress at a tensile strain of 0.1% and a stress at a tensile strain of 0.5% was calculated and tensile modulus of elasticity of the cord was calculated. The results are listed on Tables 1 to 4. The cross section of the cord in the calculation of the stress was calculated using an expression: $\pi \times (dc^2 \times 2 + ds^2 \times 6)/4$.

<Rubber Penetration>

The steel cords of Examples 1-1 to 1-9, Comparative Examples 1-1 to 1-8 and conventional Example 1 were dissected and picked out from the tires, and then one end of each of the steel cords was soaked with NaOH-10% aqueous solution to stand still for 24 hours, and thereafter, the "peeled rubber length" was measured. When rubber is penetrated inside the cord, rubber is not peeled. When the peeled rubber length was the same as or smaller than that of the steel cord of conventional Example 1, the evaluation was designated as ○; otherwise, the evaluation was designated as x. The results are listed on Tables 1 to 4 in combination.

<Diameter Growth>

Each test tire was mounted on a rim of a size of 8.25 inches, and then the diameter growth amount when inflated to an inner pressure of from 50 kPa to 700 kPa was measured at a center portion of the belt. When the diameter growth amount was better inhibited than that in the case of the belt of conventional Example 1 and the hoop effect was equal to or better than that of conventional Example 1, the evaluation was designated as ○; otherwise, the evaluation was designated as x. The results are listed on Tables 1 to 4 in combination.

<Belt Weight>

Each test tire was dissected and a main cross layer at a position in the center in the width direction was cut out into a size of a length in the width direction of 100 mm×a length in the circumferential direction of 500 mm, and cut out along rubber at a center position in the thickness direction between belt layers (between the first belt layer and the second belt layer, and between the third belt layer and the fourth belt layer) to measure the weight. When the dissected section was substantially lighter than that of the belt of the conventional Example 1, the evaluation was designated as ○; otherwise, the evaluation was designated as x. The results are listed on Tables 1 to 4 in combination.

<Cord Productivity>

Bending deformation was applied to each of the steel cords of Examples 1-1 to 1-9, Comparative Examples 1-1 to 1-8 and conventional Example 1 to evaluate whether there was generated a projection of the filament by visual inspection. The steel cord was cut by pinchers to evaluate whether feazing (so-called flare) of the filament was deteriorated or not by visual inspection. When the evaluation was not deteriorated compared with the conventional Example 1, the evaluation was designated as ○; otherwise, the evaluation was designated as x. The results are listed on Tables 1 to 4 in combination.

Examples 2-1 to 2-9, Conventional Example 2 and Comparative Examples 2-1 to 2-8

Tires of types as shown in FIG. 5 were manufactured in a tire size of 11R22.5/14PR. A belt was composed of four belt layers; the second belt layer and the third belt layer (a second layer and a third layer from inside in the tire radial direction) formed a main cross layer; and each of steel cords as shown in Tables 5 to 7 was applied to a tire as a reinforcing member of all belt layers, and the steel cords were arranged such that the major axis direction was aligned with the belt width direction. Angles of the belt layers of the first belt layer to the fourth belt layer was +52°, +16°, −16°, and −16° with respect to the circumferential direction. For the obtained test tires, the rubber penetration, durability, diameter growth and belt weight thereof were evaluated according to the below-mentioned procedure. At the same time, the productivities of the steel cords were also evaluated. The tensile modulus of elasticity of each rubberized steel cord cut out from the tires was calculated by the below-mentioned procedure.

<Tensile Modulus of Elasticity of Cord>

Steel cords of Examples 2-1 to 2-9, conventional Example 2 and Comparative Examples 2-1 to 2-8 were dissected and picked out from the tires, and then superfluous rubber attached to the surface of the steel cord at a grip portion was removed to perform a tensile test by a cord tensile tester. In this case, the tensile strain was measured by a video extensometer. In the measurement, the distance between marks was 100 mm, and the tensile test speed was 10 mm/min. On the obtained stress-strain curve, the slope between two points, a stress at a tensile strain of 0.1% and a stress at a tensile strain of 0.5% was calculated and tensile modulus of elasticity of the cord was calculated. When the obtained tensile modulus of elasticity of the cord was more excellent than that of conventional Example 2, the evaluation was designated as ○; otherwise, the evaluation was designated as x. The results are listed on Tables 5 to 7. The cross section of the steel cord in the calculation of the stress was calculated using an expression: $\pi \times (dc^2 \times 2 + ds^2 \times 6)/4$.

<Rubber Penetration>

The steel cords of Examples 2-1 to 2-9, conventional Example 2 and Comparative Examples 2-1 to 2-8 were dissected and picked out from the tires, and then one end of each of the steel cords was soaked with NaOH-10% aqueous solution to stand still for 24 hours, and thereafter, the "peeled rubber length" was measured. When rubber is penetrated inside the steel cord, rubber is not peeled. When the peeled rubber length was the same as or smaller than that of the steel cord of conventional Example 2, the evaluation was designated as ○; otherwise, the evaluation was designated as x. The results are listed on Tables 5 to 7 in combination.

<Durability>

The obtained tire was mounted on a rim of a size of 8.25 inches, and then, in the condition that the tire was inflated to an inner pressure of 700 kPa; a load of 26.7 kN was loaded; and a side force of 13.4 kN was applied intermittently, a durability drum test was performed at a circumferential velocity of the drum of 60 km/h. After 24-hour running, a crack on the end of the belt was measured. When the length of the crack was the same as or smaller than that in the conventional Example 2, the evaluation was designated as ○; otherwise, the evaluation was designated as x. The results are listed on Tables 5 to 7 in combination.

<Diameter Growth>

Each test tire was mounted on a rim of a size of 8.25 inches, and then the diameter growth amount when inflated to an inner pressure of from 50 kPa to 700 kPa was measured at a center portion of the belt. When the diameter growth amount was better inhibited than that in the case of the belt of conventional Example 1 and the hoop effect was equal to or better than that of conventional Example 2, the evaluation was designated as ○; otherwise, the evaluation was designated as x. The results are listed on Tables 5 to 7 in combination.

<Belt Weight>

Each test tire was dissected and a main cross layer at a position in the center in the width direction was cut out into a size of a length in the width direction of 100 mm×a length in the circumferential direction of 500 mm, and cut out along rubber at a center position in the thickness direction between belt layers (between the first belt layer and the second belt layer, and between the third belt layer and the fourth belt layer) to measure the weight. When the dissected section was substantially lighter than that of the belt of the conventional Example 2, the evaluation was designated as ○; otherwise, the evaluation was designated as x. The results are listed on Tables 5 to 7 in combination.

<Cord Productivity>

Bending deformation was applied to each of the steel cords of Examples 2-1 to 2-9, conventional Example 2 and Comparative Examples 2-1 to 2-8 to evaluate whether there was generated a projection of the filament by visual inspection. The steel cord was cut by pinchers to evaluate whether feazing (so-called flare) of the filament was deteriorated or not by visual inspection. When the evaluation was not deteriorated compared with the conventional Example 2, the evaluation was designated as ○; otherwise, the evaluation was designated as x. The results are listed on Tables 5 to 7 in combination.

Examples 3-1 to 3-9, Comparative Examples 3-1 to 3-8 and Conventional Example 3

Tires of types as shown in FIG. 6 were manufactured in a tire size of 445/50R22.5. A belt was composed of four belt layers, and steel cords as shown in Tables 8 to 10 were applied as a reinforcing member of the third belt layer and the fourth belt layer. The third belt layer and the fourth belt layer (a third layer and a fourth layer from inside in the tire radial direction) formed a main cross layer crossing in an angle of +50° and steel cords were arranged such that the major axis direction was aligned with the belt width direction. A steel cord (3+9+15) structure having a wave form such that the initial elongation amount was 1.2% was embedded in the first belt layer and the second belt layer such that the structure was parallel to the equatorial plane. 22 counts/50 mm. For the obtained test tires, the rubber penetration, steering stability and belt weight thereof were evaluated according to the below-mentioned procedure. At the same time, the productivities and the tensile modulus of elasticity of the cord of the steel cords were also evaluated. The tensile modulus of elasticity of each rubberized cord cut out from the tires was calculated by the below-mentioned procedure.

<Tensile Modulus of Elasticity of Cord>

Steel cords constituting the cross belt of the tires of Examples 3-1 to 3-9, Comparative Examples 3-1 to 3-8 and conventional Example 3 were dissected and picked out from the tires, and then superfluous rubber attached to the surface of the steel cord at a grip portion was removed to perform a tensile test by a cord tensile tester. In this case, the tensile strain was measured by a video extensometer. In the measurement, the distance between marks was 100 mm, and the tensile test speed was 10 mm/min. On the obtained stress-strain curve, the slope between two points, a stress at a tensile strain of 0.1% and a stress at a tensile strain of 0.5% was calculated and tensile modulus of elasticity of the cord was calculated. When the obtained tensile modulus of elasticity of the cord was more excellent than that of conventional Example 3, the evaluation was designated as ○; otherwise, the evaluation was designated as x. The results are listed on Tables 8 to 10. The cross section of the cord in the calculation of the stress was calculated using an expression: $\pi \times (dc^2 \times 2 + ds^2 \times 6)/4$.

<Rubber Penetration>

The steel cords constituting the cross belt of the tires of Examples 3-1 to 3-9, Comparative Examples 3-1 to 3-8 and conventional Example 3 were dissected and picked out from the tires, and then one end of each of the steel cords was soaked with NaOH-10% aqueous solution to stand still for 24 hours, and thereafter, the "peeled rubber length" was measured. When rubber is penetrated inside the cord, rubber is not peeled. When the peeled rubber length was the same as or smaller than that of the steel cord of conventional Example 3, the evaluation was designated as ○; otherwise, the evaluation was designated as x. The results are listed on Tables 8 to 10 in combination.

<Steering Stability>

Each test tire was mounted on a rim of a size of 14 inches, and then the side force when the tire was inflated to an inner pressure of 760 kPa, a load of 41.7 kN was loaded and a slip angle was applied was measured by a drum tester. When the side force was the same or better compared to the tire of conventional Example 3, the evaluation was designated as ○; otherwise, the evaluation was designated as x. The results are listed on Tables 8 to 10 in combination.

<Belt Weight>

Each test tire was dissected and a main cross layer at a position in the center in the width direction was cut out into a size of a length in the width direction of 100 mm×a length in the circumferential direction of 500 mm, and cut out along rubber at a center position in the thickness direction between belt layers (between the second belt layer and the third belt layer, and between the third belt layer and the fourth belt layer) to measure the weight. When the dissected section was substantially lighter than that of the belt of the conventional Example 3, the evaluation was designated as ○; otherwise, the evaluation was designated as x. The results are listed on Tables 8 to 10 in combination.

<Cord Productivity>

Bending deformation was applied to each of the steel cords used for the cross belt of each tire of Examples 3-1 to 3-9, Comparative Examples 3-1 to 3-8 and conventional Example 3 to evaluate whether there was generated a projection of the filament by visual inspection. The steel cord was cut by pinchers to evaluate whether feazing (so-called flare) of the filament was deteriorated or not by visual inspection. When the evaluation was not deteriorated compared with the conventional Example 3, the evaluation was designated as ○; otherwise, the evaluation was designated as x. The results are listed on Tables 8 to 10 in combination.

Examples 4-1 to 4-13, Comparative Examples 4-1 to 4-8 and Conventional Example 4-1, 4-2

Each of the steel cord and non-metal cords as shown in Tables 11 to 14 below was applied to a belt layer and a belt reinforcing layer to manufacture a tire having a tire size of 205/65R16. The belt was composed of three belt layers, and steel cords as shown in Tables 1 to 4 were applied as a reinforcing material of all belt layers. The angles of the belt layer was +50°, +20° and −20° from inside in the tire radial direction. The steel cord was arranged such that the major axis direction was aligned with the belt width direction. For the reinforcing cord of the belt reinforcing layer, a two-twisted nylon having 1400 dtex was used, and the cord was arranged such that the end count per 50 mm was 48 and that the cord was parallel to the tire circumferential direction. For the obtained test tires, the rubber penetration, high-speed durability test, diameter growth and belt weight thereof were evaluated according to the below-mentioned procedure. At the same time, the productivities and tensile modulus of elasticity of the cord of the steel cords were also evaluated. The tensile modulus of elasticity of each rubberized steel cord cut out from the tires was calculated by the below-mentioned procedure.

<Tensile Modulus of Elasticity of Cord>

Each of the steel cord and non-metal cords as shown in Tables 11 to 14 below was applied to a belt layer and a belt reinforcing layer to manufacture a tire having a tire size of 205/65R16. The belt was composed of three belt layers, and steel cords as shown in Tables 11 to 14 were applied as a reinforcing material of all belt layers. The angles of the belt layer was +50°, +20° and −20° from inside in the tire radial direction. The steel cord was arranged such that the major axis direction was aligned with the belt width direction. For the reinforcing cord of the belt reinforcing layer, a two-twisted nylon having 1400 dtex was used, and the cord was arranged such that the end count per 50 mm was 48 and that the cord was parallel to the tire circumferential direction. For the obtained test tires, the rubber penetration, high-speed durability test, diameter growth and belt weight thereof were evaluated according to the below-mentioned procedure. At the same time, the productivities and tensile modulus of elasticity of the cord of the steel cords were also evaluated. The tensile modulus of elasticity of each rubberized steel cord cut out from the tires was calculated by the below-mentioned procedure.

<Rubber Penetration>

The steel cords of tires of Examples 4-1 to 4-13, Comparative Examples 4-1 to 4-8 and conventional Example 4-1, 4-2 were dissected and picked out from the tires, and then one end of each of the steel cords was soaked with NaOH-10% aqueous solution to stand still for 24 hours, and thereafter, the "peeled rubber length" was measured. When rubber is penetrated inside the steel cord, rubber is not peeled. When the peeled rubber length was the same as or smaller than that of the steel cord of conventional Example 1, the evaluation was designated as ○; otherwise, the evaluation was designated as x. The results are listed on Tables 11 to 14 in combination.

<High-Speed Durability>

The obtained tire was mounted on a rim of 6J, and then a high-speed durability drum test was performed in which the tire was inflated to an inner pressure of 600 kPa, a load of 8.9 kN was loaded and the speed was increased by 8 km/h for every 30 minutes. Time until a failure originated from the belt portion occurred was measured and the time was compared with that in the tires of Example 4-1, 4-2 to perform evaluation. When the time is equal to or better than that of conventional Examples, the evaluation was designated as ○; otherwise, the evaluation was designated as x. The results are listed on Tables 11 to 14 in combination.

<Diameter Growth>

Each test tire was mounted on a rim of 6J, and then the diameter growth amount when inflated to an inner pressure of from 50 kPa to 600 kPa was measured at a center portion of the belt. When the diameter growth amount was better inhibited than that in the case of the belt of conventional Example 4-1, 4-2 and the hoop effect was equal to or better than that of conventional Example 1, the evaluation was designated as ○; otherwise, the evaluation was designated as x. The results are listed on Tables 11 to 14 in combination.

<Belt Weight>

Each test tire was dissected and a cross layer at a position in the center in the width direction was cut out into a size of a length in the width direction of 100 mm×a length in the circumferential direction of 500 mm, and cut out along rubber at a center position in the thickness direction between belt layers (between the first belt layer and the second belt layer, and between the second belt layer and the third belt layer) to measure the weight. When the dissected section was substantially lighter than that of the belt of the conventional Example 4-1, 4-2, the evaluation was designated as ○; otherwise, the evaluation was designated as x. The results are listed on Tables 11 to 14 in combination.

<Cord Productivity>

Bending deformation was applied to each of the steel cords of Examples 4-1 to 4-13, Comparative Examples 4-1 to 4-8 and conventional Example 4-1, 4-2 to evaluate whether there was generated a projection of the filament by visual inspection. The steel cord was cut by pinchers to evaluate whether feazing (so-called flare) of the filament was deteriorated or not by visual inspection. When the evaluation was not deteriorated compared with the conventional Example 4-1, 4-2, the evaluation was designated as ○; otherwise, the evaluation was designated as x. The results are listed on Tables 11 to 14 in combination.

Examples 5-1 to 5-6, Comparative Examples 5-1 to 5-4 and conventional Example 5-1

Tires of types as shown in FIG. 4 were manufactured in a tire size of 12.00R20. A belt was composed of four belt layers, and steel cords as shown in Tables 15 and 16 were employed as a reinforcing material of the outermost belt layer. The steel cord was arranged such that the major axis direction was aligned with the belt width direction, and the belt angle was set to +18° with respect to the tire circumferential direction. The second belt layer and the third belt layer (a second layer and a third layer from inside in the tire radial direction) formed a main cross layer crossing at an angle of ±18°; the cord structure of the steel cord of the reinforcing material was 3+9+15×0.23+0.23, the end count was 21 counts/50 mm. The cord structure of the steel cord of the first belt layer was 1+6×0.34, the angle of the belt with respect to the tire circumferential direction was −50° and the end count was 18 counts/50 mm. For the obtained test tires, the rubber penetration, cut resistant property and belt weight thereof were evaluated according to the below-mentioned procedure. At the same time, the productivities of the steel cords of Examples 5-1 to 5-6, Comparative Examples 5-1 to 5-4 and conventional Example 5-1 were also evaluated according to the below-mentioned procedure.

<Cut Resistant Property>

The obtained tire was mounted on a rim of a size of 8.50 inches, and then the tire was inflated to an inner pressure of 700 kPa. The tire was fitted to a vehicle, and a practical test was performed by allowing the vehicle to travel mainly on a rough road for a fixed period of time until the tread portion was completely worn. After the practical test the tire was dissected, and the number of cuts on the belt portion and corrosion propagation property from the cut was measured. When the number of cuts and the corrosion propagation property were the same or better compared to the tire of conventional Example 5-1, the evaluation was designated as ○; otherwise, the evaluation was designated as x. The results are listed on Tables 15 to 16 in combination.

<Belt Weight>

Each test tire was dissected and the outermost layer at a position in the center in the width direction was cut out into a size of a length in the width direction of 100 mm×a length in the circumferential direction of 500 mm, and cut out along a center position in the thickness direction between the third belt layer and the fourth belt layer and a boundary between the fourth belt and the tread rubber to measure the weight. When the dissected section was substantially lighter than that of the belt of the conventional Example 5-1, the evaluation was designated as ○; otherwise, the evaluation was designated as x. The results are listed on Tables 15 and 16 in combination.

<Cord Productivity>

Bending deformation was applied to each of the steel cords of Examples 5-1 to 5-6, Comparative Examples 5-1 to 5-4 and conventional Example 5-1 to evaluate whether there was generated a projection of the filament by visual inspection. The steel cord was cut by pinchers to evaluate whether feazing (so-called flare) of the filament was deteriorated or not by visual inspection. When the evaluation was not deteriorated compared with the conventional Example 5-1, the evaluation was designated as ○; otherwise, the evaluation was designated as x. The results are listed on Tables 15 and 16 in combination.

Examples 5-7 to 5-13, Comparative Examples 5-5 to 5-8 and Conventional Example 5-2

Tires of types as shown in FIG. 4 were manufactured in a tire size of 21.00R35. A belt was composed of three belt layers, and steel cords as shown in Tables 17 and 18 were employed as a reinforcing material of the outermost belt layer. The steel cord was arranged such that the major axis direction was aligned with the belt width direction, and the belt angle was set to +22° with respect to the tire circumferential direction. The first belt layer and the second belt layer (a first layer and a second layer from inside in the tire radial direction) formed a main cross layer crossing at an angle of ±22°; the cord structure of the steel cord of the reinforcing material was 7×(1+6)×0.21, the end count was 17 counts/50 mm. For the obtained test tires, the rubber penetration, cut resistant property and belt weight thereof were evaluated according to the below-mentioned procedure. At the same time, the productivities of the steel cords of Examples 5-7 to 5-13, Comparative Examples 5-5 to 5-8 and conventional Example 5-2 were also evaluated according to the below-mentioned procedure.

<Cut Resistant Property>

The obtained tire was mounted on a rim of a size of 15.00 inches, and then the tire was inflated to an inner pressure of 500 kPa. The tire was fitted to a vehicle, and a practical test was performed by allowing the vehicle to travel mainly on a rough road for a fixed period of time until the tread portion was completely worn. After the practical test the tire was dissected, and the number of cuts on the belt portion and corrosion propagation property from the cut was measured. When the number of cuts and the corrosion propagation property were the same or better compared to the tire of conventional Example 5-2, the evaluation was designated as ○; otherwise, the evaluation was designated as x. The results are listed on Tables 17 to 18 in combination.

<Belt Weight>

Each test tire was dissected and the outermost layer at a position in the center in the width direction was cut out into a size of a length in the width direction of 100 mm×a length in the circumferential direction of 500 mm, and cut out along a center position in the thickness direction between the second belt layer and the third belt layer and a boundary between the third belt and the tread rubber to measure the weight. When the dissected section was substantially lighter than that of the belt of the conventional Example 5-2, the evaluation was designated as ○; otherwise, the evaluation was designated as x. The results are listed on Tables 17 and 18 in combination.

<Cord Productivity>

Bending deformation was applied to each of the steel cords of Examples 5-7 to 5-13, Comparative Examples 5-5 to 5-8 and conventional Example 5-2 to evaluate whether there was generated a projection of the filament by visual inspection. The steel cord was cut by pinchers to evaluate whether feazing (so-called flare) of the filament was deteriorated or not by visual inspection. When the evaluation was not deteriorated compared with the conventional Example 5-2, the evaluation was designated as ○; otherwise, the evaluation was designated as x. The results are listed on Tables 17 and 18 in combination.

TABLE 1

|  | Example 1-1 | Example 1-2 | Example 1-3 | Example 1-4 | Example 1-5 |
|---|---|---|---|---|---|
| cord structure | 2 + 6 | 2 + 6 | 2 + 6 | 2 + 6 | 2 + 6 |
| core filament dc (mm) | 0.21 | 0.23 | 0.23 | 0.24 | 0.25 |
| sheath filament ds (mm) | 0.31 | 0.32 | 0.35 | 0.37 | 0.29 |
| sheath filament pitch p(mm) | 10.0 | 15.0 | 15.0 | 20.0 | 10.0 |
| D (μm) | 26 | 41 | 26 | 27 | 69 |
| tensile modulus of elasticity of the cord (GPa)* | 190 | 195 | 200 | 200 | 195 |
| cord minor axis (mm) | 0.86 | 0.90 | 0.97 | 1.02 | 0.86 |
| peeled rubber length (mm) | 4.0 | 2.0 | 4.0 | 4.0 | 2.0 |
| rubber penetration | ○ | ○ | ○ | ○ | ○ |
| diameter growth | ○ | ○ | ○ | ○ | ○ |
| belt weight | ○ | ○ | ○ | ○ | ○ |
| cord productivity | ○ | ○ | ○ | ○ | ○ |

*tensile modulus of elasticity of rubberized cord cut out from the tire

TABLE 2

|  | Example 1-6 | Example 1-7 | Example 1-8 | Example 1-9 | Conventional Example 1 |
|---|---|---|---|---|---|
| cord structure | 2 + 6 | 2 + 6 | 2 + 6 | 2 + 6 | 1 + 6 |
| core filament dc (mm) | 0.25 | 0.26 | 0.27 | 0.29 | 0.34 |
| sheath filament ds (mm) | 0.33 | 0.37 | 0.32 | 0.35 | 0.34 |
| sheath filament pitch (mm) | 15.0 | 15.0 | 15.0 | 20.0 | 17.0 |
| D (μm) | 53 | 41 | 75 | 79 | — |
| tensile modulus of elasticity of the cord (GPa)* | 200 | 195 | 205 | 205 | 185 |
| cord minor axis (mm) | 0.95 | 1.04 | 0.95 | 1.03 | 1.07 |
| peeled rubber length (mm) | 1.0 | 2.0 | 3.0 | 4.0 | 4.0 |
| rubber penetration | ○ | ○ | ○ | ○ | control |
| diameter growth | ○ | ○ | ○ | ○ | control |
| belt weight | ○ | ○ | ○ | ○ | control |
| cord productivity | ○ | ○ | ○ | ○ | control |

*tensile modulus of elasticity of rubberized cord cut out from the tire

TABLE 3

|  | Comparative Example 1-1 | Comparative Example 1-2 | Comparative Example 1-3 | Comparative Example 1-4 |
|---|---|---|---|---|
| cord structure | 2 + 6 | 2 + 6 | 2 + 6 | 2 + 6 |
| core filament dc (mm) | 0.21 | 0.21 | 0.25 | 0.27 |
| sheath filament ds (mm) | 0.33 | 0.37 | 0.27 | 0.45 |
| sheath filament pitch (mm) | 10.0 | 15.0 | 15.0 | 20.0 |
| D (μm) | 15 | 0.0 | 83 | 13 |
| tensile modulus of elasticity of the cord (GPa)* | 190 | 200 | 190 | 200 |
| cord minor axis (mm) | 0.90 | 0.99 | 0.82 | 1.22 |
| peeled rubber length (mm) | 6.0 | 60.0 | 4.0 | 12.0 |
| rubber penetration | x | x | ○ | x |
| diameter growth | ○ | ○ | ○ | ○ |
| belt weight | ○ | ○ | ○ | x |
| cord productivity | ○ | ○ | x | ○ |

*tensile modulus of elasticity of rubberized cord cut out from the tire

TABLE 4

|  | Comparative Example 1-5 | Comparative Example 1-6 | Comparative Example 1-7 | Comparative Example 1-8 |
|---|---|---|---|---|
| cord structure | 2 + 6 | 2 + 6 | 2 + 6 | 2 + 6 |
| core filament dc (mm) | 0.28 | 0.35 | 0.26 | 0.32 |
| sheath filament ds (mm) | 0.30 | 0.35 | 0.35 | 0.30 |
| sheath filament pitch (mm) | 20.0 | 15.0 | 5.0 | 30.0 |
| D (μm) | 95 | 127 | 17 | 130 |

TABLE 4-continued

|  | Comparative Example 1-5 | Comparative Example 1-6 | Comparative Example 1-7 | Comparative Example 1-8 |
|---|---|---|---|---|
| tensile modulus of elasticity of the cord (GPa)* | 200 | 205 | 180 | 205 |
| cord minor axis (mm) | 0.92 | 1.09 | 1.00 | 0.96 |
| peeled rubber length (mm) | 5.0 | 18.0 | 5.0 | 15.0 |
| rubber penetration | x | x | x | x |
| diameter growth | ○ | ○ | x | ○ |
| belt weight | ○ | x | ○ | ○ |
| cord productivity | x | x | ○ | x |

*tensile modulus of elasticity of rubberized cord cut out from the tire

TABLE 5

|  | Example 2-1 | Example 2-2 | Example 2-3 | Example 2-4 | Example 2-5 | Example 2-6 |
|---|---|---|---|---|---|---|
| cord structure | 2 + 6 | 2 + 6 | 2 + 6 | 2 + 6 | 2 + 6 | 2 + 6 |
| core filament dc (mm) | 0.21 | 0.23 | 0.23 | 0.24 | 0.25 | 0.25 |
| sheath filament ds (mm) | 0.31 | 0.32 | 0.35 | 0.37 | 0.29 | 0.33 |
| sheath filament pitch (mm) | 10.0 | 15.0 | 15.0 | 20.0 | 10.0 | 15.0 |
| D (μm) | 26 | 41 | 26 | 27 | 69 | 53 |
| tensile modulus of elasticity of the cord (GPa)* | 190 | 195 | 200 | 200 | 195 | 200 |
| cord minor axis (mm) | 0.86 | 0.90 | 0.97 | 1.02 | 0.86 | 0.95 |
| end count (count/50 mm) | 31.5 | 25.0 | 23.5 | 21.0 | 27.5 | 25.5 |
| amount of steel (index) | 106 | 91 | 100 | 99 | 87 | 100 |
| cord interval (mm) | 0.53 | 0.88 | 0.94 | 1.14 | 0.72 | 0.78 |
| belt thickness (mm) | 1.31 | 1.46 | 1.57 | 1.58 | 1.42 | 1.51 |
| peeled rubber length (mm) | 4.0 | 2.0 | 4.0 | 4.0 | 2.0 | 1.0 |
| rubber penetration | ○ | ○ | ○ | ○ | ○ | ○ |
| durability | ○ | ○ | ○ | ○ | ○ | ○ |
| diameter growth | ○ | ○ | ○ | ○ | ○ | ○ |
| belt weight | ○ | ○ | ○ | ○ | ○ | ○ |
| cord productivity | ○ | ○ | ○ | ○ | ○ | ○ |

*tensile modulus of elasticity of rubberized steel cord cut out from the tire

TABLE 6

|  | Example 2-7 | Example 2-8 | Example 2-9 | Conventional Example 2 | Comparative Example 2-1 | Comparative Example 2-2 |
|---|---|---|---|---|---|---|
| cord structure | 2 + 6 | 2 + 6 | 2 + 6 | 1 + 6 | 2 + 6 | 2 + 6 |
| core filament dc (mm) | 0.26 | 0.27 | 0.29 | 0.34 | 0.21 | 0.21 |
| sheath filament ds (mm) | 0.37 | 0.32 | 0.35 | 0.34 | 0.33 | 0.37 |
| sheath filament pitch (mm) | 15.0 | 15.0 | 20.0 | 17.0 | 10.0 | 15.0 |
| D (μm) | 41 | 75 | 79 | — | 15 | 0 |
| tensile modulus of elasticity of the cord (GPa)* | 195 | 205 | 205 | 185 | 190 | 200 |
| cord minor axis (mm) | 1.04 | 0.95 | 1.03 | 1.07 | 0.90 | 0.99 |
| end count (count/50 m) | 20.5 | 26.0 | 18.5 | 24.5 | 33.0 | 25.1 |
| amount of steel (index) | 99 | 100 | 84 | 100 | 123 | 115 |
| cord interval (mm) | 1.15 | 0.72 | 1.40 | 0.79 | 0.41 | 0.81 |
| belt thickness (mm) | 1.54 | 1.51 | 1.64 | 1.63 | 1.20 | 1.79 |
| peeled rubber length (mm) | 2.0 | 3.0 | 4.0 | 4.0 | 6.0 | 60.0 |
| rubber penetration | ○ | ○ | ○ | control | x | x |
| durability | ○ | ○ | ○ | control | x | ○ |
| diameter growth | ○ | ○ | ○ | control | ○ | ○ |
| belt weight | ○ | ○ | ○ | control | ○ | x |
| cord productivity | ○ | ○ | ○ | control | ○ | ○ |

*tensile modulus of elasticity of rubberized steel cord cut out from the tire

TABLE 7

|  | Comparative Example 2-3 | Comparative Example 2-4 | Comparative Example 2-5 | Comparative Example 2-6 | Comparative Example 2-7 | Comparative Example 2-8 |
|---|---|---|---|---|---|---|
| cord structure | 2 + 6 | 2 + 6 | 2 + 6 | 2 + 6 | 2 + 6 | 2 + 6 |
| core filament dc (mm) | 0.25 | 0.27 | 0.28 | 0.35 | 0.26 | 0.32 |

TABLE 7-continued

|  | Comparative Example 2-3 | Comparative Example 2-4 | Comparative Example 2-5 | Comparative Example 2-6 | Comparative Example 2-7 | Comparative Example 2-8 |
| --- | --- | --- | --- | --- | --- | --- |
| sheath filament ds (mm) | 0.27 | 0.45 | 0.30 | 0.35 | 0.35 | 0.30 |
| sheath filament pitch (mm) | 15.0 | 20.0 | 20.0 | 15.0 | 5.0 | 30.0 |
| D (μm) | 83 | 13 | 95 | 127 | 17 | 130 |
| tensile modulus of elasticity of the cord (GPa)* | 190 | 200 | 200 | 205 | 180 | 205 |
| cord minor axis (mm) | 0.82 | 1.22 | 0.92 | 1.09 | 1.00 | 0.96 |
| end count (count/50 mm) | 20.0 | 23.0 | 31.0 | 22.0 | 33.0 | 16.0 |
| amount of steel (index) | 57 | 158 | 109 | 109 | 145 | 60 |
| cord interval (mm) | 1.44 | 0.71 | 0.43 | 0.84 | 0.27 | 1.86 |
| belt thickness (mm) | 1.38 | 1.78 | 1.82 | 1.99 | 1.56 | 1.16 |
| peeled rubber length (mm) | 4.0 | 12.0 | 5.0 | 18.0 | 5.0 | 15.0 |
| rubber penetration | ○ | x | x | x | x | x |
| durability | ○ | ○ | x | ○ | x | ○ |
| diameter growth | x | ○ | ○ | ○ | ○ | x |
| belt weight | ○ | x | x | x | ○ | x |
| cord productivity | x | ○ | x | x | ○ | x |

*tensile modulus of elasticity of rubberized steel cord cut out from the tire

TABLE 8

|  | Example 3-1 | Example 3-2 | Example 3-3 | Example 3-4 | Example 3-5 | Example 3-6 |
| --- | --- | --- | --- | --- | --- | --- |
| cord structure | 2 + 6 | 2 + 6 | 2 + 6 | 2 + 6 | 2 + 6 | 2 + 6 |
| core filament dc (mm) | 0.21 | 0.23 | 0.23 | 0.24 | 0.25 | 0.25 |
| sheath filament ds (mm) | 0.31 | 0.32 | 0.35 | 0.37 | 0.29 | 0.33 |
| D (μm) | 26 | 41 | 26 | 27 | 69 | 53 |
| sheath filament pitch (mm) | 10.0 | 15.0 | 15.0 | 20.0 | 10.0 | 15.0 |
| tensile modulus of elasticity of the cord (GPa)* | 195 | 195 | 200 | 200 | 195 | 200 |
| cord interval (mm) | 0.53 | 0.88 | 0.94 | 1.14 | 0.72 | 0.78 |
| belt thickness (mm) | 1.31 | 1.46 | 1.57 | 1.58 | 1.42 | 1.51 |
| cord minor axis (mm) | 0.86 | 0.90 | 0.97 | 1.02 | 0.86 | 0.95 |
| peeled rubber length (mm) | 4.0 | 3.0 | 4.0 | 4.0 | 2.0 | 1.0 |
| rubber penetration | ○ | ○ | ○ | ○ | ○ | ○ |
| steering stability | ○ | ○ | ○ | ○ | ○ | ○ |
| belt weight | ○ | ○ | ○ | ○ | ○ | ○ |
| cord productivity | ○ | ○ | ○ | ○ | ○ | ○ |

*tensile modulus of elasticity of rubberized cord cut out from the tire

TABLE 9

|  | Example 3-7 | Example 3-8 | Example 3-9 | Comparative Example 3-1 | Comparative Example 3-2 | Comparative Example 3-3 |
| --- | --- | --- | --- | --- | --- | --- |
| cord structure | 2 + 6 | 2 + 6 | 2 + 6 | 2 + 6 | 2 + 6 | 2 + 6 |
| core filament dc (mm) | 0.26 | 0.27 | 0.29 | 0.21 | 0.21 | 0.25 |
| sheath filament ds (mm) | 0.37 | 0.32 | 0.35 | 0.33 | 0.37 | 0.27 |
| D (μm) | 41 | 75 | 79 | 15 | 0 | 83 |
| sheath filament pitch (mm) | 15.0 | 15.0 | 20.0 | 10.0 | 15.0 | 15.0 |
| tensile modulus of elasticity of the cord (GPa)* | 195 | 205 | 205 | 190 | 210 | 190 |
| cord interval (mm) | 1.15 | 0.72 | 1.40 | 0.41 | 0.81 | 1.44 |
| belt thickness (mm) | 1.54 | 1.51 | 1.64 | 1.20 | 1.79 | 1.38 |
| cord minor axis (mm) | 1.04 | 0.95 | 1.03 | 0.90 | 0.99 | 0.82 |
| peeled rubber length (mm) | 3.0 | 2.0 | 4.0 | 6.0 | 60.0 | 5.0 |
| rubber penetration | ○ | ○ | ○ | x | x | x |
| steering stability | ○ | ○ | ○ | ○ | ○ | ○ |
| belt weight | ○ | ○ | ○ | ○ | x | ○ |
| cord productivity | ○ | ○ | ○ | ○ | ○ | x |

*tensile modulus of elasticity of rubberized cord cut out from the tire

TABLE 10

|  | Comparative Example 3-4 | Comparative Example 3-5 | Comparative Example 3-6 | Comparative Example 3-7 | Comparative Example 3-8 | Conventional Example 3 |
| --- | --- | --- | --- | --- | --- | --- |
| cord structure | 2 + 6 | 2 + 6 | 2 + 6 | 2 + 6 | 2 + 6 | 1 + 6 |
| core filament dc (mm) | 0.27 | 0.28 | 0.35 | 0.26 | 0.32 | 0.34 |
| sheath filament ds (mm) | 0.45 | 0.30 | 0.35 | 0.35 | 0.30 | 0.34 |
| D (μm) | 13 | 95 | 127 | 17 | 130 | — |
| sheath filament pitch (mm) | 20.0 | 20.0 | 15.0 | 5.0 | 30.0 | 17.0 |
| tensile modulus of elasticity of the cord (GPa)* | 205 | 200 | 205 | 175 | 205 | 185 |
| cord interval (mm) | 0.71 | 0.43 | 0.84 | 0.27 | 1.86 | 0.79 |
| belt thickness (mm) | 1.78 | 1.82 | 1.99 | 1.56 | 1.16 | 1.63 |
| cord minor axis (mm) | 1.22 | 0.92 | 1.09 | 1.00 | 0.96 | 1.03 |
| peeled rubber length (mm) | 12.0 | 5.0 | 18.0 | 5.0 | 15.0 | 4.0 |
| rubber penetration | x | x | x | x | x | control |
| steering stability | ○ | ○ | ○ | x | ○ | control |
| belt weight | x | x | x | ○ | x | control |
| cord productivity | ○ | x | x | ○ | x | control |

*tensile modulus of elasticity of rubberized cord cut out from the tire

TABLE 11

|  |  | Example 4-1 | Example 4-2 | Example 4-3 | Example 4-4 | Example 4-5 | Example 4-6 |
| --- | --- | --- | --- | --- | --- | --- | --- |
| belt reinforcing layer | arranged site | layered layer | layered layer | layered layer | layered layer | layered layer | layered layer |
|  | cord material | nylon | nylon | nylon | nylon | nylon | nylon |
|  | end count (count/50 mm) | 48 | 48 | 48 | 48 | 48 | 48 |
| belt layer | cord structure | 2 + 6 | 2 + 6 | 2 + 6 | 2 + 6 | 2 + 6 | 2 + 6 |
|  | core filament dc (mm) | 0.21 | 0.23 | 0.25 | 0.25 | 0.26 | 0.27 |
|  | sheath filament ds (mm) | 0.31 | 0.32 | 0.29 | 0.33 | 0.37 | 0.32 |
|  | D (μm) | 26 | 41 | 69 | 53 | 41 | 75 |
|  | sheath filament pitch (mm) | 10.0 | 15.0 | 10.0 | 15.0 | 15.0 | 15.0 |
|  | tensile modulus of elasticity of the cord (GPa)* | 190 | 195 | 195 | 200 | 195 | 205 |
|  | cord interval (mm) | 0.53 | 0.88 | 0.72 | 0.78 | 1.15 | 0.72 |
|  | belt thickness (mm) | 1.31 | 1.46 | 1.42 | 1.51 | 1.54 | 1.51 |
|  | cord minor axis (mm) | 0.86 | 0.90 | 0.86 | 0.95 | 1.04 | 0.95 |
| peeled rubber length (mm) |  | 4.0 | 2.0 | 2.0 | 1.0 | 2.0 | 3.0 |
| rubber penetration |  | ○ | ○ | ○ | ○ | ○ | ○ |
| steering stability |  | ○ | ○ | ○ | ○ | ○ | ○ |
| diameter growth |  | ○ | ○ | ○ | ○ | ○ | ○ |
| belt weight |  | ○ | ○ | ○ | ○ | ○ | ○ |
| cord productivity |  | ○ | ○ | ○ | ○ | ○ | ○ |

*tensile modulus of elasticity of rubberized cord cut out from the tire

TABLE 12

|  |  | Example 4-7 | Example 4-8 | Example 4-9 | Example 4-10 | Example 4-11 | Example 4-12 | Example 4-13 |
| --- | --- | --- | --- | --- | --- | --- | --- | --- |
| belt reinforcing layer | arranged site | cap layer | cap layer | cap layer | cap layer | cap layer | cap layer | cap layer |
|  | cord material | nylon | nylon | nylon | nylon | nylon | nylon | nylon |
|  | end count (count/50 mm) | 48 | 48 | 48 | 48 | 48 | 48 | 48 |
| belt layer | cord structure | 2 + 6 | 2 + 6 | 2 + 6 | 2 + 6 | 2 + 6 | 2 + 6 | 2 + 6 |
|  | core filament dc (mm) | 0.23 | 0.24 | 0.29 | 0.23 | 0.25 | 0.25 | 0.26 |
|  | sheath filament ds (mm) | 0.35 | 0.37 | 0.35 | 0.32 | 0.29 | 0.33 | 0.37 |
|  | D (μm) | 26 | 27 | 79 | 41 | 69 | 53 | 41 |
|  | sheath filament pitch (mm) | 15.0 | 20.0 | 20.0 | 15.0 | 10.0 | 15.0 | 15.0 |

TABLE 12-continued

|  |  | Example 4-7 | Example 4-8 | Example 4-9 | Example 4-10 | Example 4-11 | Example 4-12 | Example 4-13 |
|---|---|---|---|---|---|---|---|---|
|  | tensile modulus of elasticity of the cord (GPa)* | 200 | 200 | 205 | 195 | 195 | 200 | 195 |
|  | cord interval (mm) | 0.94 | 1.14 | 1.40 | 0.88 | 0.72 | 0.78 | 1.15 |
|  | belt thickness (mm) | 1.57 | 1.58 | 1.64 | 1.46 | 1.42 | 1.51 | 1.54 |
|  | cord minor axis (mm) | 0.97 | 1.02 | 1.03 | 0.90 | 0.86 | 0.95 | 1.04 |
| peeled rubber length (mm) |  | 4.0 | 4.0 | 4.0 | 2.0 | 2.0 | 10 | 2.0 |
| rubber penetration |  | ○ | ○ | ○ | ○ | ○ | ○ | ○ |
| high-speed durability |  | ○ | ○ | ○ | ○ | ○ | ○ | ○ |
| diameter growth |  | ○ | ○ | ○ | ○ | ○ | ○ | ○ |
| belt weight |  | ○ | ○ | ○ | ○ | ○ | ○ | ○ |
| cord productivity |  | ○ | ○ | ○ | ○ | ○ | ○ | ○ |

*tensile modulus of elasticity of rubberized cord cut out from the tire

TABLE 13

|  |  | Conventional Example 4-1 | Comparative Example 4-1 | Comparative Example 4-2 | Comparative Example 4-3 | Comparative Example 4-4 |
|---|---|---|---|---|---|---|
| belt reinforcing layer | arranged site | layered layer | layered layer | layered layer | layered layer | layered layer |
|  | cord material | nylon | nylon | nylon | nylon | nylon |
|  | end count (count/50 mm) | 48 | 48 | 48 | 48 | 48 |
| belt layer | cord structure | 1 + 6 | 2 + 6 | 2 + 6 | 2 + 6 | 2 + 6 |
|  | core filament dc (mm) | 0.34 | 0.21 | 0.25 | 0.27 | 0.26 |
|  | sheath filament ds (mm) | 0.34 | 0.37 | 0.27 | 0.45 | 0.35 |
|  | D (μm) | — | 0 | 83 | 13 | 17 |
|  | sheath filament pitch (mm) | 17.0 | 15.0 | 15.0 | 20.0 | 5.0 |
|  | tensile modulus of elasticity of the cord (GPa)* | 185 | 200 | 190 | 200 | 180 |
|  | cord interval (mm) | 0.79 | 0.81 | 1.44 | 0.71 | 0.27 |
|  | belt thickness (mm) | 1.63 | 1.79 | 1.38 | 1.78 | 1.56 |
|  | cord minor axis (mm) | 1.07 | 0.99 | 0.82 | 1.22 | 1.00 |
| peeled rubber length (mm) |  | 4.0 | 60.0 | 5.0 | 12.0 | 5.0 |
| rubber penetration |  | control | x | x | x | x |
| high-speed durability |  | control | ○ | ○ | ○ | x |
| diameter growth |  | control | ○ | x | ○ | x |
| belt weight |  | control | x | ○ | x | ○ |
| cord productivity |  | control | ○ | x | ○ | ○ |

*tensile modulus of elasticity of rubberized cord cut out from the tire

TABLE 14

|  |  | Conventional Example 4-2 | Comparative Example 4-5 | Comparative Example 4-6 | Comparative Example 4-7 | Comparative Example 4-8 |
|---|---|---|---|---|---|---|
| belt reinforcing layer | arranged site | cap layer | cap layer | cap layer | cap layer | cap layer |
|  | cord material | nylon | nylon | nylon | nylon | nylon |
|  | end count (count/50 mm) | 48 | 48 | 48 | 48 | 48 |
| belt layer | cord structure | 1 + 6 | 2 + 6 | 2 + 6 | 2 + 6 | 2 + 6 |
|  | core filament dc (mm) | 0.34 | 0.21 | 0.28 | 0.35 | 0.32 |

TABLE 14-continued

|  |  | Conventional Example 4-2 | Comparative Example 4-5 | Comparative Example 4-6 | Comparative Example 4-7 | Comparative Example 4-8 |
|---|---|---|---|---|---|---|
|  | sheath filament ds (mm) | 0.34 | 0.33 | 0.30 | 0.35 | 0.30 |
|  | D (μm) | — | 15 | 95 | 127 | 130 |
|  | sheath filament pitch (mm) | 17.0 | 10.0 | 20.0 | 15.0 | 30.0 |
|  | tensile modulus of elasticity of the cord (GPa)* | 185 | 190 | 200 | 205 | 205 |
|  | cord interval (mm) | 0.79 | 0.41 | 0.43 | 0.84 | 1.86 |
|  | belt thickness (mm) | 1.63 | 1.20 | 1.82 | 1.99 | 1.16 |
|  | cord minor axis (mm) | 1.07 | 0.90 | 0.92 | 1.09 | 0.96 |
| peeled rubber length (mm) |  | 4.0 | 6.0 | 5.0 | 18.0 | 15.0 |
| rubber penetration |  | control | x | x | x | x |
| high-speed durability |  | control | x | x | ○ | ○ |
| diameter growth |  | control | ○ | ○ | ○ | ○ |
| belt weight |  | control | ○ | x | x | ○ |
| cord productivity |  | control | ○ | x | x | x |

*tensile modulus of elasticity of rubberized cord cut out from the tire

TABLE 15

|  |  | Example 5-1 | Example 5-2 | Example 5-3 | Example 5-4 | Example 5-5 | Example 5-6 |
|---|---|---|---|---|---|---|---|
| cross layer | cord structure | 3 + 9 + 15 | 3 + 9 + 15 | 3 + 9 + 15 | 3 + 9 + 15 | 3 + 9 + 15 | 3 + 9 + 15 |
|  | end count (count/50 mm) | 21 | 21 | 21 | 21 | 21 | 21 |
| outermost layer | cord structure | 2 + 6 | 2 + 6 | 2 + 6 | 2 + 6 | 2 + 6 | 2 + 6 |
|  | core filament dc (mm) | 0.21 | 0.23 | 0.25 | 0.25 | 0.26 | 0.27 |
|  | sheath filament ds (mm) | 0.31 | 0.32 | 0.29 | 0.33 | 0.37 | 0.32 |
|  | D (μm) | 26 | 41 | 69 | 53 | 41 | 75 |
|  | sheath filament pitch (mm) | 10.0 | 15.0 | 10.0 | 15.0 | 15.0 | 15.0 |
|  | end count (count/50 mm) | 28.0 | 20.0 | 27.5 | 25.5 | 18.0 | 22.5 |
|  | cord interval (mm) | 0.72 | 1.38 | 0.72 | 0.78 | 1.49 | 1.02 |
|  | belt thickness (mm) | 1.31 | 1.46 | 1.42 | 1.51 | 1.54 | 1.51 |
|  | cord minor axis (mm) | 0.86 | 0.90 | 0.86 | 0.95 | 1.04 | 0.95 |
| cut resistant property |  | ○ | ○ | ○ | ○ | ○ | ○ |
| belt weight |  | ○ | ○ | ○ | ○ | ○ | ○ |
| cord productivity |  | ○ | ○ | ○ | ○ | ○ | ○ |

TABLE 16

|  |  | Conventional Example 5-1 | Comparative Example 5-1 | Comparative Example 5-2 | Comparative Example 5-3 | Comparative Example 5-4 |
|---|---|---|---|---|---|---|
| cross layer | cord structure | 3 + 9 + 15 | 3 + 9 + 15 | 3 + 9 + 15 | 3 + 9 + 15 | 3 + 9 + 15 |
|  | end count (count/50 mm) | 21 | 21 | 21 | 21 | 21 |
| outermost layer | cord structure | 1 + 6 | 2 + 6 | 2 + 6 | 2 + 6 | 2 + 6 |
|  | core filament dc (mm) | 0.34 | 0.21 | 0.25 | 0.27 | 0.26 |
|  | sheath filament ds (mm) | 0.34 | 0.37 | 0.27 | 0.45 | 0.35 |
|  | D (μm) | — | 0 | 83 | 13 | 17 |
|  | sheath filament pitch (mm) | 17.0 | 15.0 | 15.0 | 20.0 | 5.0 |

TABLE 16-continued

|  |  | Conventional Example 5-1 | Comparative Example 5-1 | Comparative Example 5-2 | Comparative Example 5-3 | Comparative Example 5-4 |
| --- | --- | --- | --- | --- | --- | --- |
|  | end count (count/50 mm) | 24.5 | 20.5 | 20.0 | 23.0 | 33.0 |
|  | cord interval (mm) | 0.79 | 1.26 | 1.44 | 0.71 | 0.27 |
|  | belt thickness (mm) | 1.63 | 1.79 | 1.38 | 1.78 | 1.56 |
|  | cord minor axis (mm) | 1.07 | 0.99 | 0.82 | 1.22 | 1.00 |
| cut resistant property |  | control | x | x | x | x |
| belt weight |  | control | x | ○ | x | ○ |
| cord productivity |  | control | ○ | x | ○ | ○ |

TABLE 17

|  |  | Example 5-7 | Example 5-8 | Example 5-9 | Example 5-10 | Example 5-11 | Example 5-12 | Example 5-13 |
| --- | --- | --- | --- | --- | --- | --- | --- | --- |
| cross layer | cord structure | 7 × (1 + 6) | 7 × (1 + 6) | 7 × (1 + 6) | 7 × (1 + 6) | 7 × (1 + 6) | 7 × (1 + 6) | 7 × (1 + 6) |
|  | end count (count/50 mm) | 17 | 17 | 17 | 17 | 17 | 17 | 17 |
| outermost layer | cord structure | 2 + 6 | 2 + 6 | 2 + 6 | 2 + 6 | 2 + 6 | 2 + 6 | 2 + 6 |
|  | core filament dc (mm) | 0.23 | 0.24 | 0.29 | 0.23 | 0.25 | 0.25 | 0.26 |
|  | sheath filament ds (mm) | 0.35 | 0.37 | 0.35 | 0.32 | 0.29 | 0.33 | 0.37 |
|  | D (μm) | 26 | 27 | 79 | 41 | 69 | 53 | 41 |
|  | sheath filament pitch (mm) | 15.0 | 20.0 | 20.0 | 15.0 | 10.0 | 15.0 | 15.0 |
|  | end count (count/50 mm) | 23.5 | 21.0 | 18.5 | 25.0 | 27.5 | 25.5 | 18.5 |
|  | cord interval (mm) | 0.94 | 1.14 | 1.40 | 0.88 | 0.72 | 0.78 | 1.42 |
|  | belt thickness (mm) | 1.57 | 1.58 | 1.64 | 1.46 | 1.42 | 1.51 | 1.54 |
|  | cord minor axis (mm) | 0.97 | 1.02 | 1.03 | 0.90 | 0.86 | 0.95 | 1.04 |
| cut resistant property |  | ○ | ○ | ○ | ○ | ○ | ○ | ○ |
| belt weight |  | ○ | ○ | ○ | ○ | ○ | ○ | ○ |
| cord productivity |  | ○ | ○ | ○ | ○ | ○ | ○ | ○ |

TABLE 18

|  |  | Conventional Example 5-2 | Comparative Example 5-5 | Comparative Example 5-6 | Comparative Example 5-7 | Comparative Example 5-8 |
| --- | --- | --- | --- | --- | --- | --- |
| cross layer | cord structure | 7 × (1 + 6) | 7 × (1 + 6) | 7 × (1 + 6) | 7 × (1 + 6) | 7 × (1 + 6) |
|  | end count (count/50 mm) | 17 | 17 | 17 | 17 | 17 |
| outermost layer | cord structure | 1 + 6 | 2 + 6 | 2 + 6 | 2 + 6 | 2 + 6 |
|  | core filament dc (mm) | 0.34 | 0.21 | 0.28 | 0.35 | 0.32 |
|  | sheath filament ds (mm) | 0.34 | 0.33 | 0.30 | 0.35 | 0.30 |
|  | D (μm) | — | 15 | 95 | 127 | 130 |
|  | sheath filament pitch (mm) | 17.0 | 10.0 | 20.0 | 15.0 | 30.0 |
|  | end count (count/50 mm) | 24.5 | 33.0 | 31.0 | 22.0 | 12.0 |
|  | cord interval (mm) | 0.79 | 0.41 | 0.43 | 0.84 | 2.90 |
|  | belt thickness (mm) | 1.63 | 1.20 | 1.82 | 1.99 | 1.16 |
|  | cord minor axis (mm) | 1.07 | 0.90 | 0.92 | 1.09 | 0.96 |

TABLE 18-continued

|  | Conventional Example 5-2 | Comparative Example 5-5 | Comparative Example 5-6 | Comparative Example 5-7 | Comparative Example 5-8 |
|---|---|---|---|---|---|
| cut resistant property | control | x | x | x | x |
| belt weight | control | ○ | x | x | ○ |
| cord productivity | control | ○ | x | x | x |

From the above Tables 1 to 4, it is found that the steel cord of the present invention has both rubber penetration and productivity. It is found that tire to which the steel cord of the present invention is applied has excellent strength.

From the above Tables 5 to 7, it was confirmed that, in the pneumatic tire according to the second embodiment of the present invention, weight reduction was achieved without reducing the durability and productivity.

Further, from the above Tables 8 to 10, it was confirmed that, in the pneumatic tire according to a third embodiment of the present invention, weight reduction was achieved while improving steering stability, durability and productivity.

Still further, from the above Tables 11 to 14, it was confirmed that pneumatic tire according to a fourth embodiment of the present invention had excellent productivity and weight reduction was achieved while improving durability compared to a conventional tire.

From the above Tables 15 to 18, it was confirmed that the pneumatic tire of the fifth embodiment of the present invention had excellent durability and productivity and weight reduction was achieved.

DESCRIPTION OF THE NUMERALS 1 core filament
2 sheath filament
10 steel cord
11 bead portion
12 sidewall portion
13 tread portion
14 carcass
15 belt
16 bead core
21 bead portion
22 sidewall portion
23 tread portion
24 carcass
25 belt
26 bead core
31 tread portion
32 carcass
33 circumferential direction belt layer
34 inclined belt layer
35 belt
41 bead portion
42 sidewall portion
43 tread portion
44 carcass
45a, 45b belt layer
46 cap layer
47 layered layer
48 bead core

The invention claimed is:

1. A pneumatic tire having: a pair of bead portions; a pair of sidewall portions each extending to the outside of both the bead portions in the tire radial direction; and a tread portion extending between both the sidewall portions, and comprising; a carcass composed of at least one carcass ply which toroidally extends between the pair of bead portions and reinforces each of the portions; and a belt composed of at least one belt layer arranged on the outside of a crown portion of the carcass in the tire radial direction, wherein a steel cord for reinforcing rubber articles comprising a core formed by arranging two core filaments in parallel without twisting the filaments together, and six sheath filaments twisted around the core, wherein, letting the diameter of the core filament dc (mm), the diameter of the sheath filament ds (mm) and sheath filament twist pitch p (mm), an average sheath filament interval D represented by the following Formula (I):

$$D=[L-6ds\{1+(L/p)^2\}^{1/2}]/6 \qquad (I),$$

(where $L=(\pi+2)dc+\pi ds$) is from 25 to 80 μm is used as reinforcing members for at least one of the belt layer, and wherein the belt has at least three belt layers; the steel cord constituting the outermost belt layer of the belt is the steel cord for reinforcing rubber articles, and wherein the belt has a cross belt layer laminated such that cords are crossed each other sandwiching the tire equatorial plane, and the cord diameter of the steel cord constituting the cross belt is larger than the minor axis of the steel cord constituting the outermost belt layer.

2. The pneumatic tire according to claim 1, wherein the dc and the ds satisfy relationships represented by the following Formulae (II) to (IV):

$$dc<ds \qquad (II),$$

$$0.20 \leq dc \leq 0.32 \qquad (III), \text{ and}$$

$$0.27 \leq ds \leq 0.43 \qquad (IV).$$

3. The pneumatic tire according to claim 1, wherein the steel cord constituting the cross belt layer is a multi-twisted steel cord.

4. The pneumatic tire according to claim 1, wherein the twist pitch of the sheath filament of the steel cord constituting the outermost belt layer is from 5 to 18 mm.

5. The pneumatic tire according to claim 1, wherein the minor axis of the steel cord constituting the outermost belt layer is from 0.85 mm to 1.05 mm.

6. The pneumatic tire according to claim 1, wherein the interval between neighboring steel cords in the outermost belt layer is from 0.50 mm to 1.80 mm.

* * * * *